(12) United States Patent
Xu et al.

(10) Patent No.: US 12,446,411 B2
(45) Date of Patent: Oct. 14, 2025

(54) DISPLAY SUBSTRATE AND DISPLAY APPARATUS

(71) Applicants: Beijing BOE Technology Development Co., Ltd., Beijing (CN); BOE Technology Group Co., Ltd., Beijing (CN)

(72) Inventors: Jingjing Xu, Beijing (CN); Fei Fang, Beijing (CN); Puyu Qi, Beijing (CN); Kening Zheng, Beijing (CN); Jun Yan, Beijing (CN); Kemeng Tong, Beijing (CN); Xueguang Hao, Beijing (CN); Pan Li, Beijing (CN); Yuxin Zhang, Beijing (CN); Chunyan Li, Beijing (CN); Jingquan Wang, Beijing (CN); Xinguo Li, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/020,418

(22) PCT Filed: Feb. 25, 2022

(86) PCT No.: PCT/CN2022/078075
§ 371 (c)(1),
(2) Date: Feb. 8, 2023

(87) PCT Pub. No.: WO2023/159512
PCT Pub. Date: Aug. 31, 2023

(65) Prior Publication Data
US 2024/0260321 A1    Aug. 1, 2024

(51) Int. Cl.
*H10K 59/122*    (2023.01)
*G06F 3/041*    (2006.01)
(Continued)

(52) U.S. Cl.
CPC ......... *H10K 59/122* (2023.02); *G06F 3/0412* (2013.01); *G09G 3/3233* (2013.01);
(Continued)

(58) Field of Classification Search
CPC .... H10K 59/122; H10K 59/131; H10K 59/40; H10K 59/00; H10K 59/353;
(Continued)

(56) References Cited

U.S. PATENT DOCUMENTS

2021/0265430 A1    8/2021    Chang et al.
2021/0313405 A1    10/2021    Xu et al.
(Continued)

FOREIGN PATENT DOCUMENTS

CN    107368150 A    11/2017
CN    110166607 A    8/2019
(Continued)

*Primary Examiner* — Elmito Breval
(74) *Attorney, Agent, or Firm* — Ling Wu; Stephen Yang; Ling and Yang Intellectual Property

(57) ABSTRACT

A display substrate includes a base substrate including a display region and a frame region, multiple pixel circuits, first light-emitting elements and at least one first data line, located in a first sub-display region, multiple second light-emitting elements located in a second sub-display region. The display region includes a foldable first display region and second display region each including a first sub-display region and second sub-display region; multiple pixel circuits includes multiple first pixel circuits and second pixel circuits distributed among multiple first pixel circuits; at least one first pixel circuits is connected with at least one first light-emitting elements; at least one of multiple second pixel circuits is connected with at least one of multiple second light-emitting elements; the first data line at least includes
(Continued)

one sub-data line connected with the first pixel circuit and at least includes another sub-data line connected with the second pixel circuit.

20 Claims, 22 Drawing Sheets

(51) Int. Cl.
  *G09G 3/3233* (2016.01)
  *H10K 59/131* (2023.01)
  *H10K 59/40* (2023.01)
  *G06F 3/044* (2006.01)
(52) U.S. Cl.
  CPC ........... *H10K 59/131* (2023.02); *H10K 59/40* (2023.02); *G06F 3/0443* (2019.05); *G06F 3/0446* (2019.05); *G09G 2300/0819* (2013.01); *G09G 2300/0842* (2013.01); *G09G 2300/0861* (2013.01); *G09G 2310/08* (2013.01)
(58) Field of Classification Search
  CPC .... G06F 3/0412; G06F 3/0443; G06F 3/0446; G09G 3/3233; G09G 2300/0819; G09G 2300/0842; G09G 2300/0861; G09G 2310/08; G09G 3/32
  See application file for complete search history.

(56) References Cited

U.S. PATENT DOCUMENTS

| | | |
|---|---|---|
| 2022/0069047 A1 | 3/2022 | Yang et al. |
| 2022/0155829 A1 | 5/2022 | Lou et al. |

FOREIGN PATENT DOCUMENTS

| | | |
|---|---|---|
| CN | 110266936 A | 9/2019 |
| CN | 110767662 A | 2/2020 |
| CN | 110876018 A | 3/2020 |
| CN | 111180483 A | 5/2020 |
| CN | 111263033 A | 6/2020 |
| CN | 111863920 A | 10/2020 |
| CN | 111916486 A | 11/2020 |
| CN | 112259602 A | 1/2021 |
| CN | 111292617 B | 6/2021 |
| CN | 113327543 A | 8/2021 |
| CN | 113410269 A | 9/2021 |
| CN | 113972237 A | 1/2022 |

DISPLAY SUBSTRATE AND DISPLAY APPARATUS

CROSS-REFERENCE TO RELATED APPLICATION

The present application is a U.S. National Phase Entry of International Application No. PCT/CN2022/078075 having an international filing date of Feb. 25, 2022, the content of which is incorporated into this application by reference.

TECHNICAL FIELD

The present disclosure relates to, but is not limited to, the field of display technology, in particular to a display substrate and a display apparatus.

BACKGROUND

An Organic light-emitting Diode (OLED) is an active light-emitting display device, which has advantages such as self-luminescence, a wide angle of view, a high contrast ratio, low power consumption, an extremely high response speed, lightness and thinness, flexibility, and a low cost. With continuous development of display technologies, a flexible display apparatus that uses the OLED as a light-emitting device and uses a Thin Film Transistor (TFT) for signal control has become a mainstream product in the field of display at present.

An under panel sensing technology is a brand-new technology proposed to increase a screen-to-body ratio of a display apparatus.

SUMMARY

The following is a summary of subject matters described herein in detail. The summary is not intended to limit the protection scope of claims.

An embodiment of the present disclosure provides a display substrate, including:
- a base substrate, including a display region and a frame region located on at least one side of the display region, wherein the display region includes a first display region and a second display region, the first display region includes a first sub-region of a first sub-display region and a first sub-region of a second sub-display region, the second display region includes a second sub-region of a first sub-display region and a second sub-region of a second sub-display region, the first sub-region of the first sub-display region at least partially surrounds the first sub-region of the second sub-display region, the second sub-region of the first sub-display region at least partially surrounds the second sub-region of the second sub-display region, the first sub-region of the first sub-display region and the second sub-region of the first sub-display region form a first sub-display region, and the first sub-region of the second sub-display region and the second sub-region of the second sub-display region form a second sub-display region;
- a plurality of pixel circuits and a plurality of first light-emitting elements located in the first sub-display region; wherein the plurality of pixel circuits includes: a plurality of first pixel circuits and a plurality of second pixel circuits, the plurality of second pixel circuits are distributed among the plurality of first pixel circuits, and at least one pixel circuit of the plurality of first pixel circuits is connected with at least one light-emitting element of the plurality of first light-emitting elements;
- a plurality of second light-emitting elements located in the second sub-display region; wherein at least one pixel circuit of the plurality of second pixel circuits is connected with at least one light-emitting element of the plurality of second light-emitting elements;
- at least one first data line located in the first sub-display region; wherein the first data line includes a plurality of interconnected sub-data lines, each of the sub-data lines extends along a first direction and/or a second direction, and the first direction intersects the second direction; the first data line at least includes one sub-data line connected with the first pixel circuit and at least includes another sub-data line connected with the second pixel circuit.

In some exemplary implementations, the second sub-display region includes a blue light-emitting element, a red light-emitting element and a green light-emitting element, and the second sub-display region further includes at least one third pixel circuit connected with the blue light-emitting element, and the red light-emitting element is connected with the second pixel circuit located in the first sub-display region;

the green light-emitting element is connected with the second pixel circuit located in the first sub-display region; and/or, the second sub-display region further includes at least one fourth pixel circuit connected with the green light-emitting element.

In some exemplary implementations, the display substrate further includes at least one fifth pixel circuit, wherein a part of the fifth pixel circuit is located in the first sub-display region and another part of the fifth pixel circuit is located in the second sub-display region.

In some exemplary implementations, the display substrate further includes a virtual axis located between the first sub-display region and the second sub-display region, the virtual axis overlaps with a folding axis, and an orthographic projection of sub-data lines extending along the second direction on the display substrate does not overlap with an orthographic projection of the virtual axis on the display substrate.

In some exemplary implementations, the first data line includes a first sub-data line, a third sub-data line, a data connection line, and a second sub-data line, that are connected sequentially;

the first sub-display region includes a first part of the first sub-display region and a second part of the first sub-display region located on opposite sides of the second sub-display region in the first direction, and a third part of the first sub-display region located on opposite sides of the second sub-display region in the second direction;

the first sub-data line is located in the first part of the first sub-display region, the second sub-data line is located in the second part of the first sub-display region, the third sub-data line is located in the third part of the first sub-display region, and the data connection line is located in the frame region.

In some exemplary implementations, at least two sub-data lines of the first data line are symmetrically distributed with a center line of the first sub-region of the second sub-display region in the second direction as a symmetry axis.

In some exemplary implementations, at least one of the first data lines includes a first sub-data line and a second sub-data line that are located on a side of the center line of the first sub-region of the second sub-display region along the second direction, and includes a third sub-data line located on the other side of the center line of the first sub-region of the second sub-display region along the second direction.

In some exemplary implementations, in the first display region, a first data line overlapping with the center line of the first sub-region of the second sub-display region along the second direction is located on a side, near the first sub-region of the second sub-display region, of a first data line that does not overlap with the center line of the first sub-region of the second sub-display region along the second direction.

In some exemplary implementations, at least one of the first data lines includes a part of a sub-data line located in the first sub-region of the first sub-display region and includes a part of the sub-data lines located in the second sub-region of the first sub-display region.

In some exemplary implementations, the display substrate also includes at least one data drive chip, wherein the data drive chip is located in the frame region, the first sub-region of the second sub-display region is located on a side of the first sub-region of the first sub-display region away from the data drive chip, and the second sub-region of the second sub-display region is located on a side of the second sub-region of the first sub-display region near the data drive chip.

In some exemplary implementations, the display substrate further includes two data drive chips, wherein, one of the data drive chips is connected with a data line in the first display region and the other of the data drive chips is connected with a data line in the second display region.

In some exemplary implementations, the first display region and the second display region are symmetrically distributed with a center line of the display substrate in the first direction as a symmetry axis.

In some exemplary implementations, the first sub-region of the second sub-display region and the second sub-region of the second sub-display region are symmetrically distributed with the center line of the display substrate in the first direction as a symmetry axis, and the first sub-region of the second sub-display region and the second sub-region of the second sub-display region are located between same plurality of the first data lines.

In some exemplary implementations, the display substrate further includes two data drive chips and a second data line, wherein the second data line is connected with a column of first pixel circuits, one of the data drive chips is connected with the first data line and the other of the data drive chips is connected with the second data line.

In some exemplary implementations, both of the data drive chips are located on a side of the frame region, or the two data drive chips are located on different sides of the frame region.

In some exemplary implementations, on a plane perpendicular to the display substrate, the first sub-display region includes a base substrate and a drive circuit layer, a light-emitting structure layer, an encapsulation layer, a touch control structure layer and a color filter layer, that are sequentially stacked on the base substrate, and the second sub-display region includes a base substrate and a light-emitting structure layer, an encapsulation layer and a color filter layer, that are sequentially stacked on the base substrate.

In some exemplary implementations, The color filter layer includes a plurality of color filters of different colors and a black matrix disposed between the plurality of color filters of different colors, and a thickness of a black matrix in the second sub-display region in a direction perpendicular to the display substrate is smaller than a thickness of a black matrix in the first sub-display region in a direction perpendicular to the display substrate.

In an exemplary implementations, the light-emitting structure layer includes a pixel definition layer, an anode, a cathode, and an organic light-emitting layer, wherein: the pixel definition layer includes a first opening exposing the anode, the black matrix includes a second opening exposing the color filter, an orthographic projection of the second opening on the base substrate includes an orthographic projection of the first opening on the base substrate, and the pixel definition layer adopts a black material.

In some exemplary implementations, the touch structure layer includes a plurality of first touch electrodes arranged along a first direction and a plurality of second touch electrodes arranged along a second direction, the first touch electrode includes a plurality of first sub-electrodes connected through a first connection part, the second touch electrode includes a plurality of second sub-electrodes connected through a second connection part, the orthographic projection of the second sub-display region on the base substrate does not overlap with the orthographic projection of the first connection part on the base substrate, and the orthographic projection of the second sub-display region on the base substrate does not overlap with the orthographic projection of the second connection part on the base substrate.

An embodiment of the present disclosure also provides a display apparatus including the aforementioned display substrate.

Other aspects may be understood upon reading and understanding the drawings and the detailed description.

BRIEF DESCRIPTION OF DRAWINGS

Accompanying drawings are used for providing further understanding of technical solutions of the present disclosure, constitute a part of the specification, and together with the embodiments of the present disclosure, are used for explaining the technical solutions of the present disclosure but not to constitute limitations on the technical solutions of the present disclosure. Shapes and sizes of one or more components in the drawings do not reflect true scales, and are only intended to schematically describe contents of the present disclosure.

DETAILED DESCRIPTION

Figure 1:
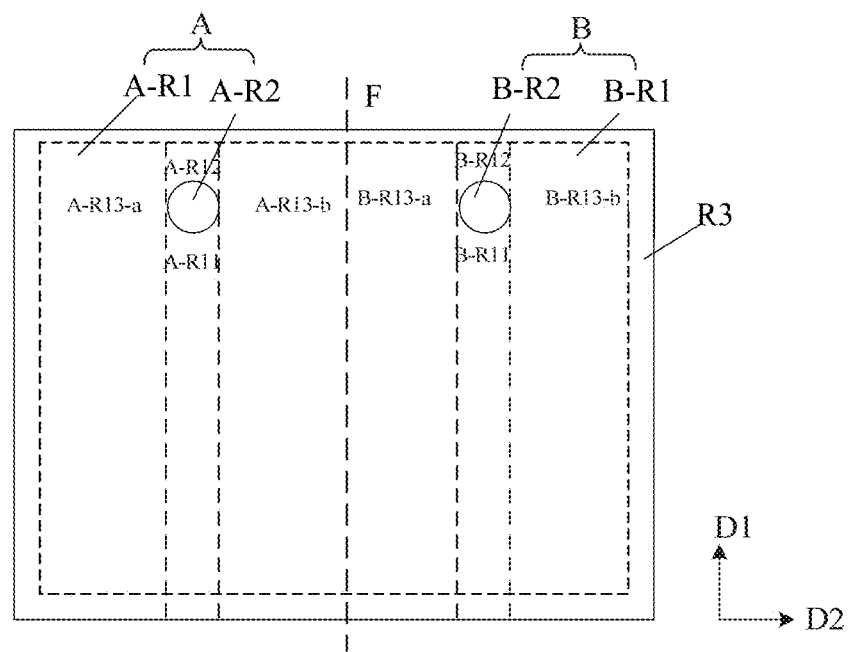
FIG. 1 is a schematic diagram of a display substrate according to at least one embodiment of the present disclosure.

The embodiments of the present disclosure will be described below in combination with the drawings in detail. Implementations may be implemented in multiple different forms. Those of ordinary skill in the art may easily understand such a fact that manners and contents may be transformed into other forms without departing from the essence and scope of the present disclosure. Therefore, the present disclosure should not be explained as being limited to contents described in following implementations only. The embodiments in the present disclosure and features in the embodiments may be combined randomly with each other without conflict.

In the drawings, a dimension of one or more constituent elements, a thickness of a layer, or a region is sometimes exaggerated for clarity. Therefore, an implementation of the present disclosure is not necessarily limited to the size, and a shape and a size of one or more components in the drawings do not reflect a true scale. In addition, the drawings schematically illustrate ideal examples, and one implementation of the present disclosure is not limited to the shapes, numerical values, or the like shown in the drawings.

Ordinal numerals such as "first", "second", and "third" in the specification are set to avoid confusion of constituent elements, but are not set to make a limit in quantity. In the present disclosure, "multiple" represents two or more than two in quantity.

In the specification, for convenience, wordings indicating orientation or positional relationships, such as "middle", "upper", "lower", "front", "back", "vertical", "horizontal", "top", "bottom", "inside", and "outside", are used for illustrating positional relationships between constituent elements with reference to the drawings, and are merely for facilitating the description of the specification and simplifying the description, rather than indicating or implying that a referred apparatus or element must have a particular orientation and be constructed and operated in the particular orientation. Therefore, they cannot be understood as limitations on the present disclosure. The positional relationships between the constituent elements are changed as appropriate according to a direction where the constituent elements are described. Therefore, appropriate replacements may be made according to situations without being limited to the wordings described in the specification.

In the specification, unless otherwise specified and defined explicitly, terms "mount", "mutually connect", and "connect" should be understood in a broad sense. For example, it may be a fixed connection, a detachable connection, or an integrated connection; it may be a mechanical connection or a connection; it may be a direct connection, an indirect connection through an intermediate component, or communication inside two components. Those of ordinary skills in the art may understand meanings of the above-mentioned terms in the present disclosure according to situations.

In the specification, a transistor refers to an element which at least includes three terminals, i.e., a gate, a drain, and a source. The transistor has a channel region between the drain (drain electrode terminal, drain region, or drain electrode) and the source (source electrode terminal, source region, or source electrode), and a current may flow through the drain, the channel region, and the source. In the specification, the channel region refers to a region through which a current mainly flows.

In the specification, a first electrode may be a drain and a second electrode may be a source, or, a first electrode may be a source and a second electrode may be a drain. In a case where transistors with opposite polarities are used, or in a case where a direction of a current changes during work of a circuit, or the like, functions of the "source" and the "drain" may sometimes be exchanged. Therefore, the "source" and the "drain" may be exchanged in the specification.

In this specification, a "connection" includes a case where constitute elements are connected with each other through an element having some electrical effect. The "element having some electrical effect" is not particularly limited as long as electrical signals between the connected constituent elements may be transmitted through the "element having some electrical effect". Examples of the "element having some electrical function" not only include an electrode and a wiring, but also include a switch element such as a transistor, a resistor, an inductor, a capacitor, another element with multiple functions, etc.

In the specification, "parallel" refers to a state in which an angle formed by two straight lines is above −10° and below 10°, and thus also includes a state in which the angle is above −5° and below 5°. In addition, "perpendicular" refers to a state in which an angle formed by two straight lines is above 80° and below 100°, and thus also includes a state in which the angle is above 85° and below 95°.

In the present disclosure, "about" refers to that a boundary is not defined so strictly and numerical values within process and measurement error ranges are allowed.

At least one embodiment of the present disclosure provides a display substrate, including: a base substrate, a plurality of pixel circuits and a plurality of first light-emitting elements, a plurality of second light-emitting elements, and at least one first data line.

The base substrate includes a first display region and a second display region. The first display region includes a first sub-region of a first sub-display region and a first sub-region of a second sub-display region. The second display region includes a second sub-region of the first sub-display region and a second sub-region of the second sub-display region. The first sub-region of the first sub-display region at least partially surrounds the first sub-region of the second sub-display region, and the second sub-region of the first sub-display region at least partially surrounds the second sub-region of the second sub-display region. The first sub-region of the first sub-display region and the second sub-region of the first sub-display region form the first sub-display region, and the first sub-region of the second sub-display region and the second sub-region of the second sub-display region form the second sub-display region.

The plurality of pixel circuits and the plurality of first light-emitting elements are located in the first sub-display region. The plurality of pixel circuits include a plurality of first pixel circuits and a plurality of second pixel circuits. The plurality of second pixel circuits are distributed among the plurality of first pixel circuits. At least one pixel circuit of the plurality of first pixel circuits is connected with at least one light-emitting element of the plurality of first light-emitting elements.

The plurality of second light-emitting elements are located in the second sub-display region. At least one pixel circuit of the plurality of second pixel circuits is connected with at least one light-emitting element of the plurality of second light-emitting elements.

At least one first data line is located in the first sub-display region. The first data line includes a plurality of interconnected sub-data lines, each of which extends along a first direction and/or a second direction, and the first direction intersects the second direction. The first data line at least includes one sub-data line connected with the first pixel circuit, and at least includes another sub-data line connected with the second pixel circuit.

The display substrate of this embodiment will be described below through several examples.

FIG. 1 is a schematic diagram of a display substrate according to at least one embodiment of the present disclosure. In some exemplary implementations, as shown in FIG. 1, a base substrate of a display substrate includes: a display region and a frame region R3 located on at least a side of the display region. The display region includes: a first display region A and a second display region B, wherein the first display region A includes a first sub-region A-R1 of the first sub-display region and a first sub-region A-R2 of the second sub-display region, the first sub-region A-R1 of the first sub-display region at least partially surrounds the first sub-region A-R2 of the second sub-display region. The second display region B includes a second sub-region B-R1 of the first sub-display region and a second sub-region B-R2 of the second sub-display region, the second sub-region B-R1 of the first sub-display region at least partially surrounds the second sub-region B-R2 of the second sub-display region. The first sub-region A-R1 of the first sub-display region and the second sub-region B-R1 of the first sub-display region form the first sub-display region, and the first sub-region A-R2 of the second sub-display region and the second sub-region B-R2 of the second sub-display region form the second sub-display region. For example, the first display region A and the second display region B shown in FIG. 1 are respectively located at the left and right sides of the center line of the display region along the second direction D2, the first sub-region A-R2 of the second sub-display region and the second sub-region B-R2 of the second sub-display region shown in FIG. 1 are respectively located in the middle of the upper part of the first sub-region A-R1 of the first sub-display region and the second sub-region B-R1 of the first sub-display region, the first sub-region A-R1 of the first sub-display region and the second sub-region B-R1 of the first sub-display region respectively have three sides adjacent to the frame region R3, and neither the first sub-region A-R2 of the second sub-display region nor the second sub-region B-R2 of the second sub-display region is adjacent to the frame region R3. However, the embodiments of the present disclosure are not limited to this. For example, the first sub-region A-R2 of the second sub-display region and the second sub-region B-R2 of the second sub-display region may each have a side adjacent to the frame region R3, and the first sub-region A-R2 of the second sub-display region and the second sub-region B-R2 of the second sub-display region may be respectively located at other positions such as an upper left corner position or an upper right corner position of the first sub-region A-R1 of the first sub-display region and the second sub-region B-R1 of the first sub-display region.

In some exemplary implementations, as shown in FIG. 1, the display region may be a rectangle, e.g., a rectangle with right angles, a rectangle with rounded corners, and the like. In some exemplary implementations, the shapes of the first sub-region A-R2 of the second sub-display region and the second sub-region B-R2 of the second sub-display region may be identical. Exemplary, the first sub-region A-R2 of the second sub-display region and the second sub-region B-R2 of the second sub-display region may both be one of the shapes of circle, rectangle, oval, or the like. However, the embodiments of the present disclosure are not limited to this. For example, the shapes of the first sub-region A-R2 of the second sub-display region and the second sub-region B-R2 of the second sub-display region may also be different. Exemplary, the first sub-region A-R2 of the second sub-display region may be circular, and the second sub-region B-R2 of the second sub-display region may be rectangular or oval or another shape.

In some exemplary implementations, the first sub-region A-R1 of the first sub-display region and the second sub-region B-R1 of the first sub-display region may be non-light-transmissive display regions, and the first sub-region A-R2 of the second sub-display region and the second sub-region B-R2 of the second sub-display region may be light-transmissive display regions. That is, the first sub-region A-R1 of the first sub-display region and the second sub-region B-R1 of the first sub-display region are non-light-transmissive, the first sub-region A-R2 of the second sub-display region and the second sub-region B-R2 of the second sub-display region are light-transmissive, and the first sub-region A-R1 of the first sub-display region, the second sub-region B-R1 of the first sub-display region, the first sub-region A-R2 of the second sub-display region and the second sub-region B-R2 of the second sub-display region are all provided with light-emitting units, thereby realizing a full screen display. For example, an orthographic projection of hardware such as a sensor (e.g., an optical sensor, an infrared sensor, a fingerprint sensor, an ultrasonic sensor, etc.) on the display substrate may be located within the first sub-region A-R2 of the second sub-display region and the second sub-region B-R2 of the second sub-display region of the display substrate. In this example, the display substrate does not need to be punched, and under a premise of ensuring practicability of the display substrate, a true full screen is achievable.

In some exemplary implementations, the display panel may include an axis F, wherein the axis F may extend along the first direction D1, and the axis F may be a dummy line. The first display region A and the second display region B are respectively located on opposite sides of the axis F. However, the embodiments of the present disclosure are not limited to this. For example, the axis F may also extend along the second direction D2.

In some exemplary implementations, the first direction D1 and the second direction D2 intersect, for example, the first direction D1 may be perpendicular to the second direction D2. In some examples, the first direction D1 is parallel to a direction of a sub-pixel column and the second direction D2 is parallel to a direction of a sub-pixel row. However, the embodiments of the present disclosure are not limited to this.

In some exemplary implementations, the display panel may include a folding axis, and the folding axis overlaps with the axis F of the display panel to achieve a foldable function. In some exemplary implementations, the display panel may have a first camera C1 (not shown in the figure), and the first camera C1 overlaps with the first sub-region A-R2 of the second sub-display region. The display panel may have a second camera C2 (not shown in the figure), and the second camera C2 overlaps with the second sub-region B-R2 of the second sub-display region, thereby realizing dual-camera image acquisition. However, the embodiments of the present disclosure are not limited to this.

As shown in FIG. 1, when the display panel is in an unfolded state, a surface of the first display region A and a surface of the second display region B are in the same plane, and the first display region A and the second display region B jointly display an image. In this case, either the first camera C1 or the second camera C2 may acquire images, or the first camera C1 and the second camera C2 may simultaneously acquire images of left and right frames, and the images of the left and right frames are processed to achieve image enhancement.

Figure 2:
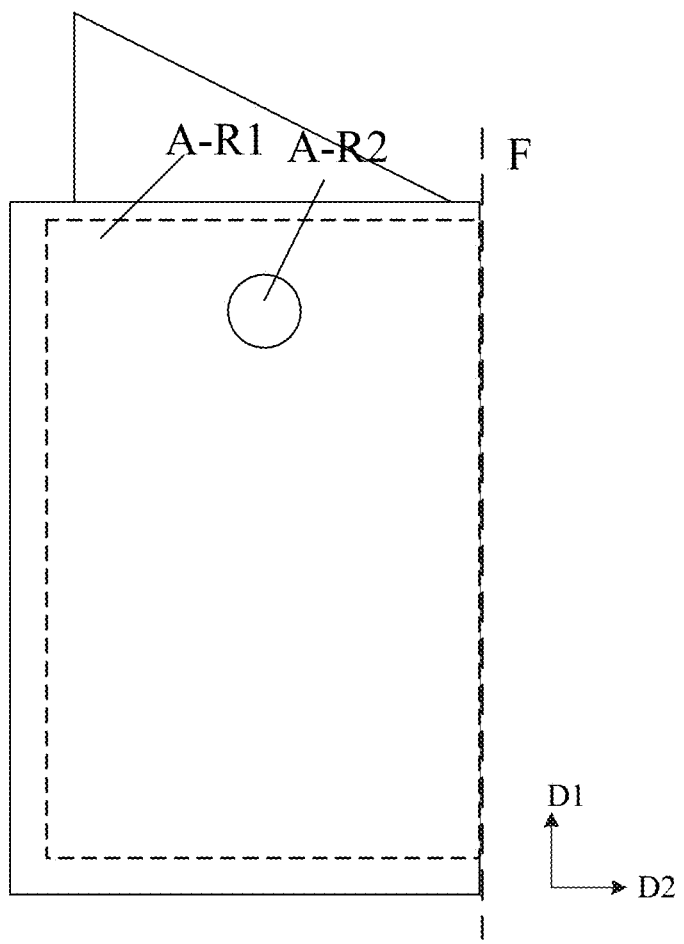
FIG. 2 is a schematic diagram of the display substrate shown in FIG. 1 in a folded state.

As shown in FIG. 2, bending the display panel along the axis F may change the display panel from a flat state (i.e. unfolded state) to a bent state (i.e. folded state). In this case, the first display region A and the second display region B are opposite, the first display region A or the second display region B displays images, and the corresponding first camera C1 or second camera C2 is used for acquiring images. For example, assuming that the first camera C1 is used to acquire an image and the first display region A is used to display an image, when a user takes a photo, the first camera C1 acquires a still image, and the first display region A displays the still image; when a user takes a video, the first camera C1 acquires moving images, and the first display region A displays the moving images.

Usually, the folding axis of the folding screen is located at a roughly centered position of the display panel. That is to say, a first display region A and a second display region B are disposed symmetrically about the axis F. In this case, if a single camera region is used, then the camera in the single camera region cannot be set at the center position of the whole display panel, but can only be set in the first display region A or the second display region B. Therefore, the problem of image quality deterioration due to asymmetry will occur in the images acquired by the single camera region. The display panel of the embodiment of the present disclosure is provided with two second sub-display region: the first sub-region A-R2 of the second sub-display region and the second sub-region B-R2 of the second sub-display region, i.e., two camera regions may be provided, thereby optimizing the problem of image quality deterioration caused by asymmetry of images acquired by the camera in single camera region. In addition, images are acquired by two cameras in two second sub-display regions, and the images acquired by the two cameras are processed, which can realize various functions such as depth of field blurring, image quality enhancement and optical zoom, and optimize graphics acquisition and display effect.

In some exemplary embodiments, the display substrate may include multiple sub-pixels disposed on the base substrate. At least one sub-pixel includes a pixel circuit and a light-emitting element. The pixel circuit is configured to drive the light-emitting element. For example, the pixel circuit is configured to provide a drive current to drive the light-emitting element to emit light. For example, the light-emitting element may be an Organic light-emitting Diode (OLED), and the light-emitting element emits red light, green light, blue light, or white light, etc. under drive of its corresponding pixel circuit. A color of light emitted from the light-emitting element may be determined as required. In some examples, the light-emitting element may include a first electrode (e.g. an anode), a second electrode (e.g. a cathode) and an organic light-emitting layer disposed between the first and second electrodes. The first electrode may be connected with the pixel circuit. However, the embodiments of the present disclosure are not limited to this. In some examples, the light-emitting element may be a Quantum Dot light-emitting Diode (QLED), a Micro light-emitting Diode (Micro-LED), or a Mini Diode (Mini-LED).

In some exemplary embodiments, a pixel unit may include three sub-pixels (for example, a red sub-pixel R, a blue sub-pixel B, and a green sub-pixel G), and the three sub-pixels may be arranged side by side horizontally, side by side vertically, or in a shape of a Chinese character "品". For example, a pixel unit may include four sub-pixels (for example, a red sub-pixel R, a blue sub-pixel B, a green sub-pixel G, and a white sub-pixel W, or, a red sub-pixel R, a blue sub-pixel B and two green sub-pixels G), and the four sub-pixels may be arranged side by side horizontally, side by side vertically, or in a shape of a square. However, the embodiments of the present disclosure are not limited to this.

Figure 3A:
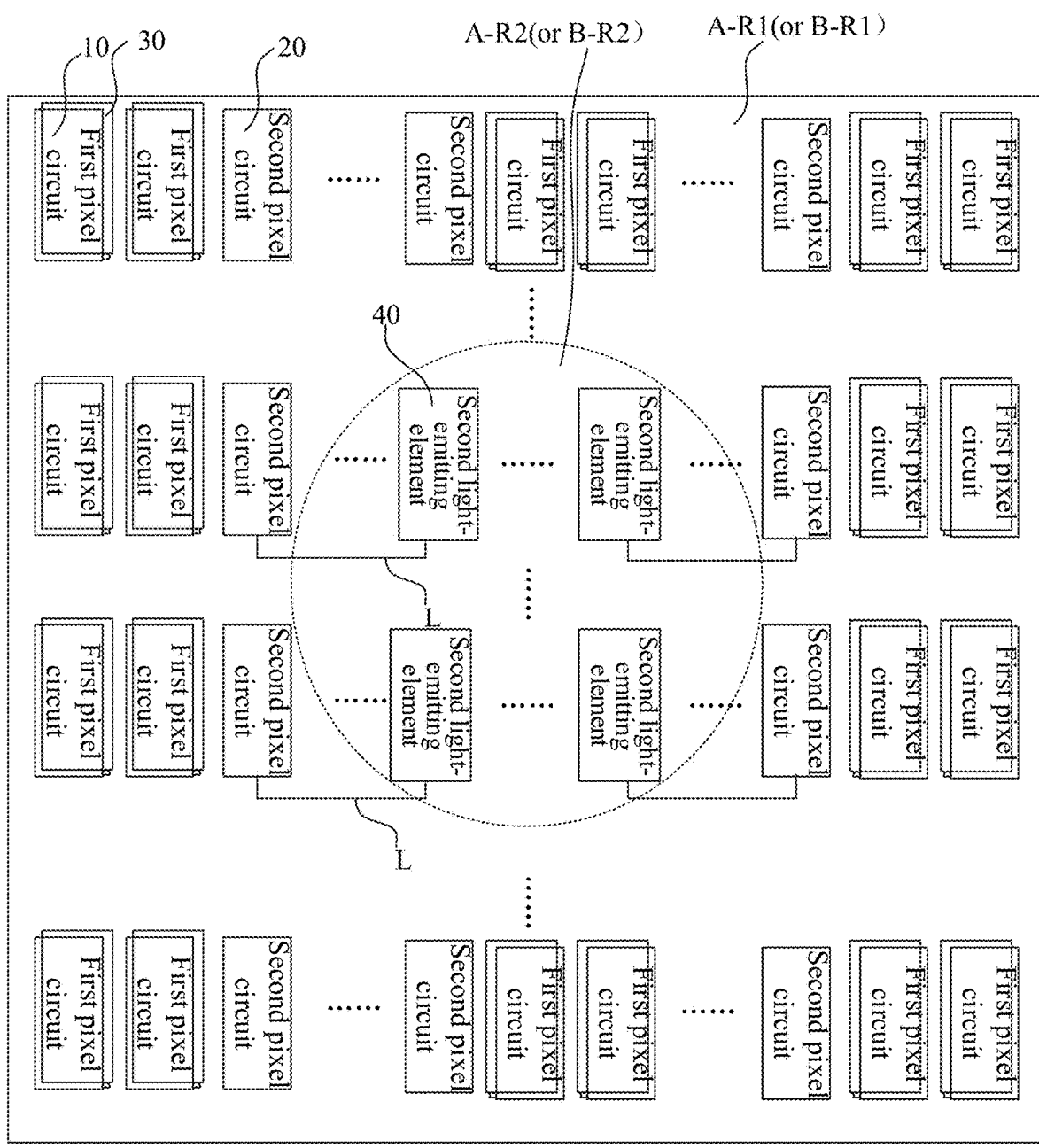
FIG. 3A to FIG. 3D are schematic diagrams of a partial structure of a first display region according to at least one embodiment of the present disclosure.

FIG. 3A is a schematic diagram of a partial structure of a display substrate according to at least one embodiment of the present disclosure. In some exemplary implementations, as shown in FIG. 3A, the display substrate includes: a plurality of first pixel circuits 10, a plurality of second pixel circuits 20, and a plurality of first light-emitting elements 30, located in the first sub-region A-R1 of the first sub-display region and/or the second sub-region B-R1 of the first sub-display region, and a plurality of second light-emitting elements 40 located in the first sub-region A-R2 of the second sub-display region and/or the second sub-region B-R2 of the second sub-display region. The plurality of second pixel circuits 20 may be separated by the plurality of first pixel circuits 10; for example, the plurality of first pixel circuits 10 may be disposed between two adjacent second pixel circuits 20 in the first direction. At least one first pixel circuit 10 of the plurality of first pixel circuits 10 may be connected with at least one first light-emitting element 30 of the plurality of first light-emitting elements 30, and an orthographic projection of at least one first pixel circuit 10 on a base substrate may be at least partially overlapped with an orthographic projection of at least one first light-emitting element 30 on the base substrate. The first pixel circuit 10 may be configured to provide a drive signal to a first light-emitting element 30 with which the first pixel circuit 10 is connected, to drive the first light-emitting element 30 to emit light. At least one second pixel circuit 20 of the plurality of second pixel circuits 20 may be connected with at least one second light-emitting element 40 of the plurality of second light-emitting elements 40 through a conductive line L. The second pixel circuit 20 may be configured to provide a drive signal to a second light-emitting element 40 with which the second pixel circuit 20 is connected, to drive the second light-emitting element 40 to emit light. Since the second light-emitting element 40 and the second pixel circuit 20 are located in different regions, there is no overlapping portion between an orthographic projection of at least one second pixel circuit 20 on the base substrate and an orthographic projection of at least one second light-emitting element 40 on the base substrate.

In some exemplary implementations, the density of the second light-emitting elements 40 of the first sub-region A-R2 of the second sub-display region may be approximately equal to the density of the first light-emitting elements 30 of the first sub-region A-R1 of the first sub-display region, and the density of the second light-emitting elements 40 of the second sub-region B-R2 of the second sub-display region may be approximately equal to the density of the first light-emitting elements 30 of the second sub-region B-R1 of the first sub-display region. That is, the resolution of the first sub-region A-R2 of the second sub-display region may be substantially the same as the resolution of the first sub-region A-R1 of the first sub-display region, and the resolution of the second sub-region B-R2 of the second sub-display region may be substantially the same as the resolution of the second sub-region B-R1 of the first sub-display region. However, the embodiments of the present disclosure are not limited to this. For example, a density of the second light-emitting elements 40 may be larger or smaller than that of the first light-emitting elements 30. That is, the resolution of the first sub-region A-R2 of the second sub-display region may be greater than or less than the resolution of the first sub-region A-R1 of the first sub-display region, and the resolution of the second sub-region B-R2 of the second sub-display region may be greater than or less than the resolution of the second sub-region B-R1 of the first sub-display region.

In some exemplary implementations, a light-emitting area of a second light-emitting element 40 may be smaller than a light-emitting area of a first light-emitting element 30. That is, the light-emitting area of the first light-emitting element 30 is larger than that of the second light-emitting element 40. A light-emitting area of a light-emitting element may correspond to an area of an opening of a pixel definition layer. In some examples, in the first sub-region A-R2 of the second sub-display region and the second sub-region B-R2 of the second sub-display region, a light-transmissive region is provided between adjacent second light-emitting elements 40. For example, a plurality of light-transmissive regions are connected with each other to form a continuous light-transmissive region separated by a plurality of second light-emitting elements 40. The conductive line L may be made of a transparent conductive material to improve a light transmittance of the light-transmissive region as much as possible.

In some exemplary implementations, in the first sub-region A-R1 of the first sub-display region and the second sub-region B-R1 of the first sub-display region, a region where a second pixel circuit 20 is provided may be obtained by reducing a size of a first pixel circuit 10 in the second direction D2. For example, the size of the first pixel circuit 10 in the second direction D2 may be smaller than a size of a first light-emitting element 30 in the second direction D2. The second direction D2 is, for example, a direction of a sub-pixel row, but it is not limited to this. In other embodiments, the second direction D2 may be a direction of a sub-pixel column. This exemplary implementation will be described by taking the second direction D2 being the direction of the sub-pixel row as an example. For example, sizes of the first pixel circuit 10 and the second pixel circuit 20 in the second direction D2 may be the same, and a size of each pixel circuit in the second direction D2 may differ from the size of the first light-emitting element 30 in the second direction D2 by about 4 microns (μm). A size of each pixel circuit in the first direction D1 is approximately the same as that of the first light-emitting element 30 in the first direction D1. The first direction D1 is perpendicular to the second direction D2.

In some exemplary implementations, a second pixel circuit 20, not connected with a light-emitting element, in the first sub-region A-R1 of the first sub-display region and the second sub-region B-R1 of the first sub-display region may be referred to as a dummy pixel circuit.

Figure 3B:
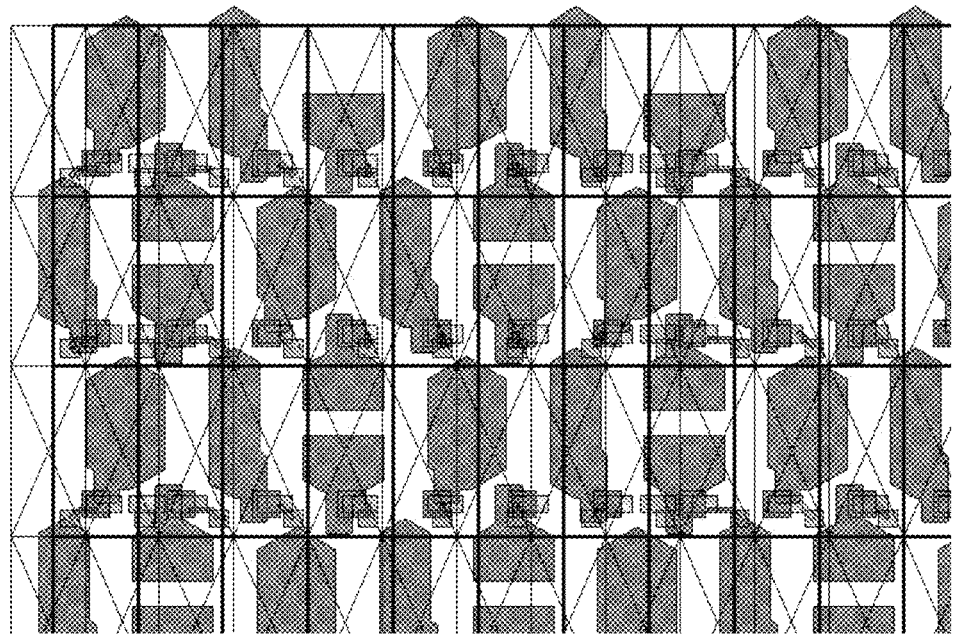
Figure 3C:
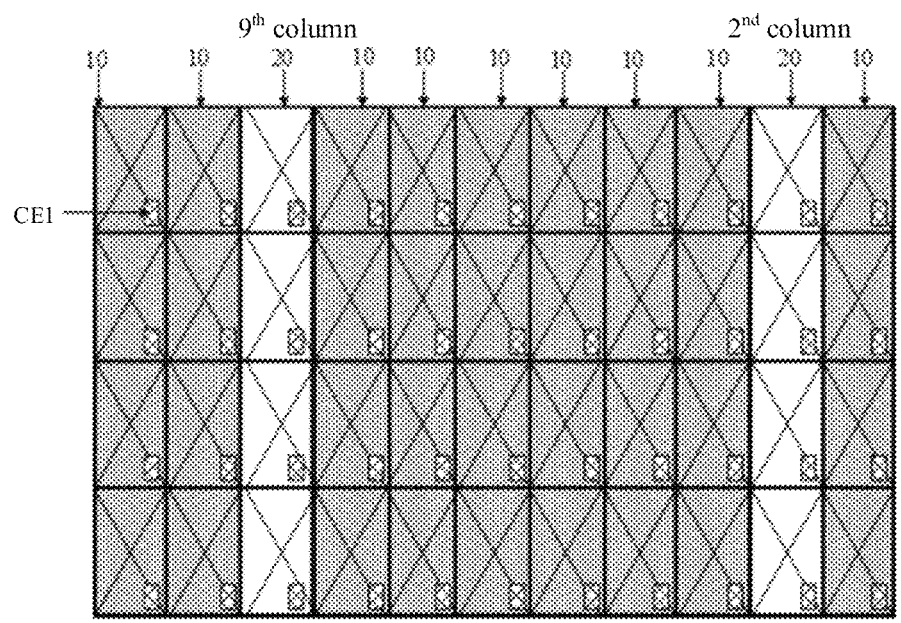
Figure 3D:
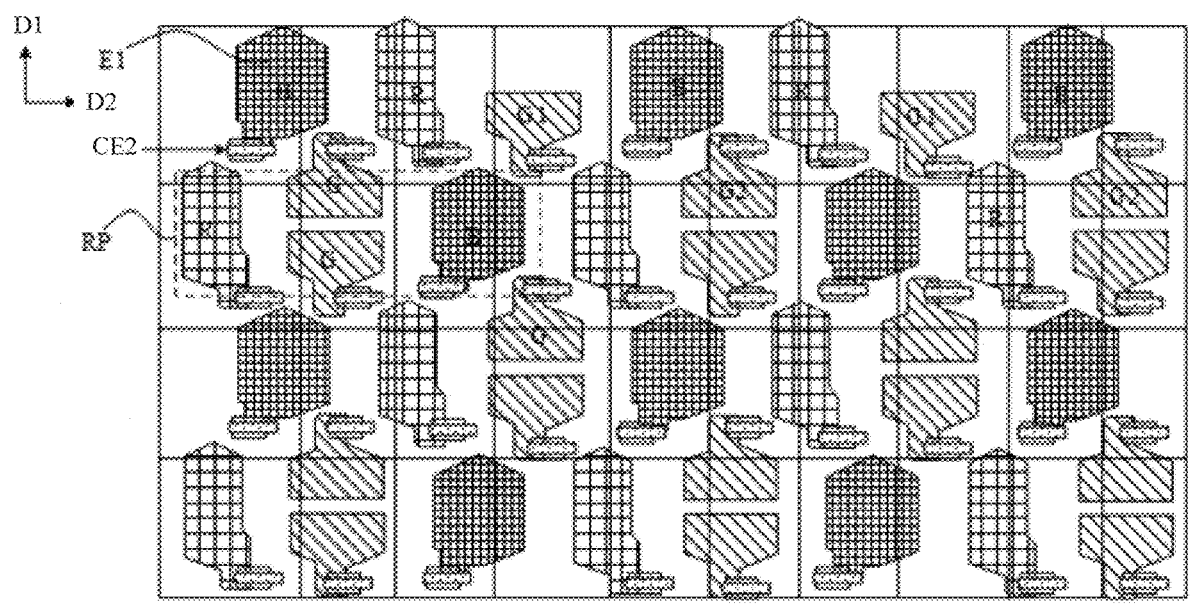

FIG. 3B to FIG. 3D are schematic diagrams of a partial structure of a first sub-display region (the first sub-region A-R1 of the first sub-display region or the second sub-region B-R1 of the first sub-display region) according to at least one embodiment of the present disclosure. In order to further show that there are extra multiple columns of pixel circuits after pixel circuits are compressed, FIG. 3B shows a schematic diagram of a structure of a sub-pixel of the first sub-region A-R1 of the first sub-display region or the second sub-region B-R1 of the first sub-display region. FIG. 3C shows a schematic diagram of a partial structure (including only pixel circuits) of the first sub-region A-R1 of the first sub-display region or the second sub-region B-R1 of the first sub-display region in FIG. 3B, and FIG. 3D shows a schematic diagram of a partial structure (including only light-emitting elements) of the first sub-region A-R1 of the first sub-display region or the second sub-region B-R1 of the first sub-display region in FIG. 3B.

In some exemplary implementations, as shown in FIG. 3B to FIG. 3D, a size of a pixel circuit in the second direction D2 is smaller than that of a light-emitting element in the second direction D2, in this way, pixel circuits in second and ninth columns from right to left are not connected with any first light-emitting element 30, and belong to extra columns of pixel circuits, which may be used as second pixel circuits 20 to be connected with second light-emitting elements 40 in first sub-region A-R2 of the second sub-display region or the second sub-region B-R2 of the second sub-display region, or only used as unused second pixel circuits 20 (i.e., dummy pixel circuits). As shown in FIG. 3D, any first light-emitting element 30 may be one of four types of light-emitting elements RG1BG2. A first electrode E1 of a first light-emitting element 30 may be connected with a first transit electrode CE1 of a first pixel circuit 10 through a second transit electrode CE2. R represents a light-emitting element that emits red light, G1 represents a light-emitting element that emits green light, B represents a light-emitting element that emits blue light, and G2 represents a light-emitting element that emits green light. At least one second pixel circuit 20 may have a first transit electrode, and at least one second light-emitting element 40 may have a second transit electrode. For example, the at least one second pixel circuit 20 and the at least one second light-emitting element 40 are connected through the conductive line L, which may include: the conductive line L is respectively connected with a first transit electrode of at least one second pixel circuit 20 and a second transit electrode of at least one second light-emitting element 40. In order to have enough space for disposing the conductive line L, axes of first and second transit electrodes in a same row of sub-pixels may be located on a straight line. However, the embodiments of the present disclosure are not limited to this.

In some exemplary embodiments, in a sub-pixel arrangement shown in FIG. 3D, one repeating unit RP includes two green (G) sub-pixels arranged in a first direction D1 and a red (R) sub-pixel and a blue (B) sub-pixel arranged respectively on two sides of the two green sub-pixels in the second direction D2. A red sub-pixel and a green sub-pixel may form a pixel unit, and a blue sub-pixel in another repeating unit adjacent to it may be borrowed to form a dummy pixel together with the red sub-pixel and the green sub-pixels for display. A blue sub-pixel and green sub-pixels may form a pixel unit, and a red sub-pixel in another repeating unit adjacent to it may be borrowed to form a dummy pixel together with the blue sub-pixel and the green sub-pixels for display. However, the embodiments of the present disclosure are not limited to this.

In some exemplary implementations, in order to improve the light transmittance of the first sub-region A-R2 of the second sub-display region and the second sub-region B-R2 of the second sub-display region, only the light-emitting elements may be provided in the first sub-region A-R2 of the second sub-display region and the second sub-region B-R2 of the second sub-display region, and pixel circuits driving the light-emitting elements of the first sub-region A-R2 of the second sub-display region and the second sub-region B-R2 of the second sub-display region may be provided in the first sub-region A-R1 of the first sub-display region and the second sub-region B-R1 of the first sub-display region. That is, the light transmittance of the first sub-region A-R2 of the second sub-display region and the second sub-region B-R2 of the second sub-display region is improved by separately disposing the light-emitting elements from the pixel circuits. In this example, no pixel circuit is provided in the first sub-region A-R2 of the second sub-display region and the second sub-region B-R2 of the second sub-display region.

In some other exemplary implementations, light-emitting elements and pixel circuits driving the light-emitting elements of the first sub-region A-R2 of the second sub-display region and the second sub-region B-R2 of the second sub-display region may be provided in the first sub-region A-R2 of the second sub-display region and the second sub-region B-R2 of the second sub-display region. For example, pixel circuits for driving the light-emitting elements of the first sub-region A-R2 of the second sub-display region and the second sub-region B-R2 of the second sub-display region may all be provided in the first sub-region A-R2 of the second sub-display region and the second sub-region B-R2 of the second sub-display region, in this case, the data line may have no additional winding. To improve the light transmittance of the first sub-region A-R2 of the second sub-display region and the second sub-region B-R2 of the second sub-display region, the signal lines (including but not limited to data lines, power lines, scan lines, etc.) of the first sub-region A-R2 of the second sub-display region and the second sub-region of the second sub B-R2 display region may adopt a transparent metal, such as ITO traces.

In some still exemplary implementations, pixel circuits that drive part of the light-emitting elements of the first sub-region A-R2 of the second sub-display region and the second sub-region B-R2 of the second sub-display region may be provided in the first sub-region A-R2 of the second sub-display region and the second sub-region B-R2 of the second sub-display region, and pixel circuits that drive another part of the light-emitting elements of the first sub-region A-R2 of the second sub-display region and the second sub-region B-R2 of the second sub-display region may be provided in the first sub-region A-R1 of the first sub-display region and the second sub-region B-R1 of the first sub-display region. In this case, the data lines of at least part of the external pixel circuits need to be wound.

Figure 3E:
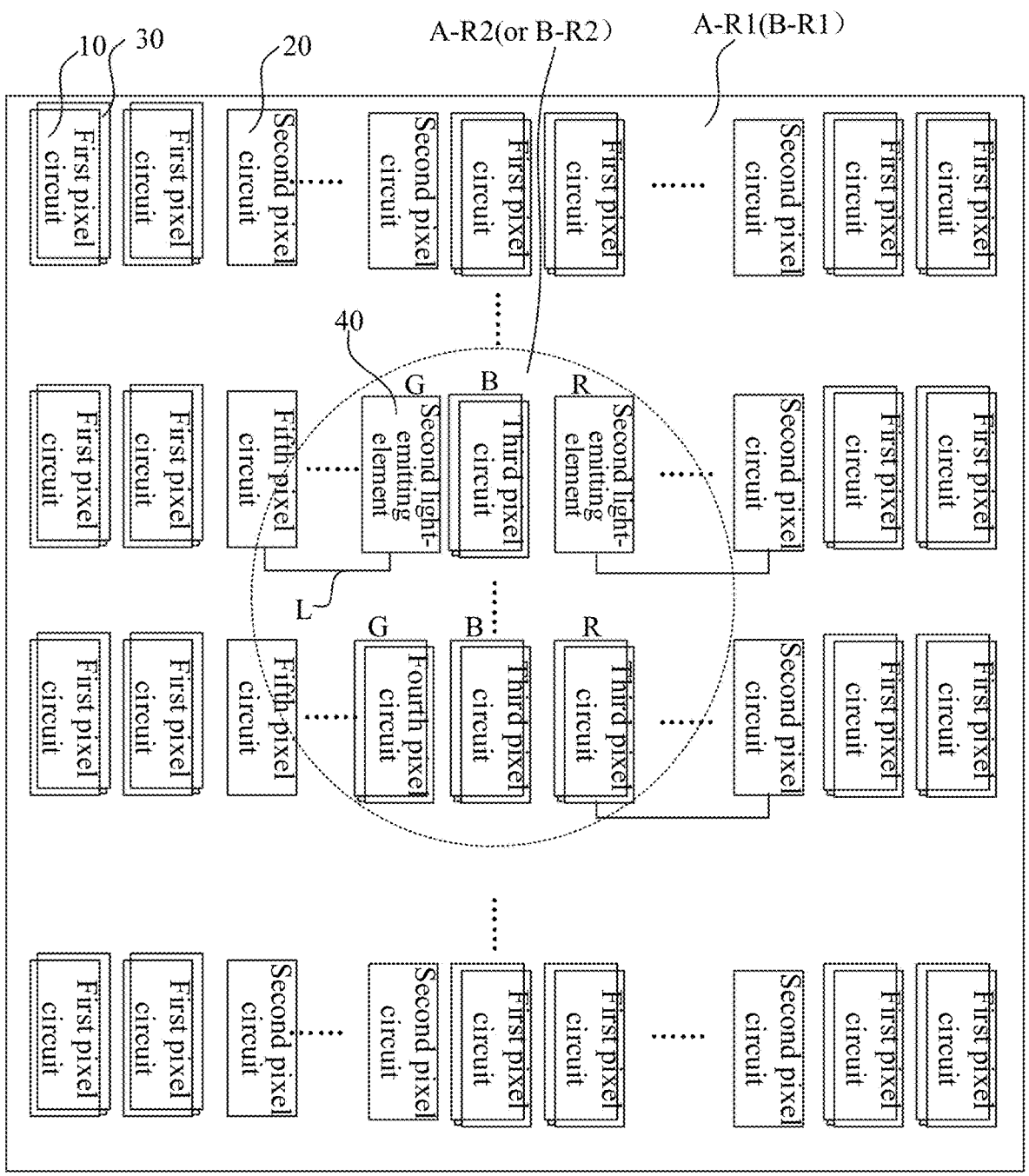
FIG. 3E is another schematic diagram of a partial structure of a first display region according to at least one embodiment of the present disclosure.

In some exemplary implementations, as shown in FIG. 3E, the second sub-display region includes a blue light-emitting element, a red light-emitting element, and a green light-emitting element, and the second sub-display region further includes at least one third pixel circuit connected with the blue light-emitting element, the red light-emitting element is connected with the second pixel circuit located in the first sub-display region.

Figure 4A:
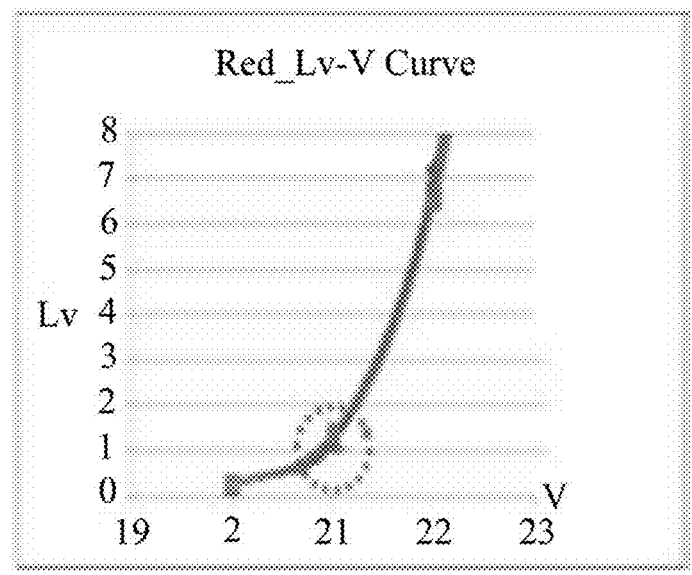
FIG. 4A to FIG. 4C are schematic diagrams of brightening voltages of red, green and blue sub-pixels.
Figure 4B:
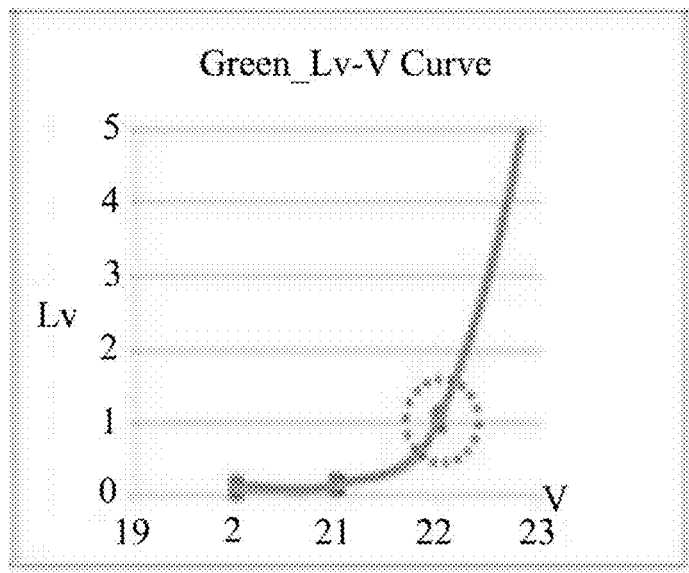
Figure 4C:
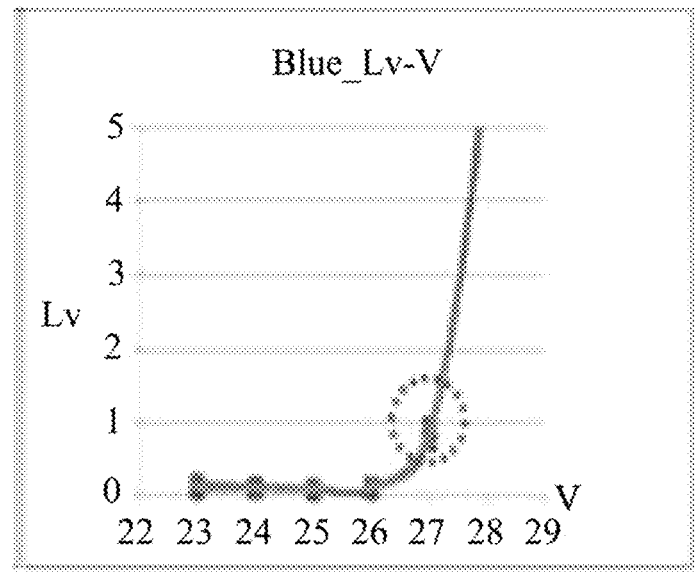

As shown in FIG. 4A, FIG. 4B, and FIG. 4C, the relationship of the brightening voltages $V_R$, $V_G$, $V_B$ of the RGB sub-pixels is considered as follows: $V_R < V_G < V_B$, pixel circuits for driving blue light-emitting elements of the first sub-region A-R2 of the second sub-display region and the second sub-region B-R2 of the second sub-display region may be disposed in the first sub-region A-R2 of the second sub-display region and the second sub-region B-R2 of the second sub-display region, and pixel circuits for driving red light-emitting elements of the first sub-region A-R2 of the second sub-display region and the second sub-region B-R2 of the second sub-display region may be disposed in the first sub-region A-R1 of the first sub-display region and the second sub-region B-R1 of the first sub-display region, in this way, the brightening voltage of the red light-emitting elements in the first sub-region A-R2 of the second sub-display region and the second sub-region B-R2 of the second sub-display region of the second sub-display area may be increased by reducing the resistance of the data line winding, so as to avoid the inconsistency between the brightening voltages of the red sub-pixels and the blue sub-pixels.

In some exemplary implementations, a green light-emitting element in the second sub-display region may be connected with a second pixel circuit located in the first sub-display region; and/or, as shown in FIG. 3E, the second sub-display region may further include at least one fourth pixel circuit, the green light-emitting element in the second sub-display region may be connected with the fourth pixel circuit.

In this embodiment, pixel circuits driving green light-emitting elements of the first sub-region A-R2 of the second sub-display region and the second sub-region B-R2 of the second sub-display region may be disposed in the first sub-region A-R2 of the second sub-display region and the second sub-region B-R2 of the second sub-display region, and pixel circuits driving green light-emitting elements of the first sub-region A-R2 of the second sub-display region and the second sub-region B-R2 of the second sub-display region may also be disposed in the first sub-region A-R1 of the first sub-display region and the second sub-region B-R1 of the first sub-display region, which is not limited by the present disclosure.

In some exemplary implementations, as shown in FIG. 3E, the display substrate may also include at least one fifth pixel circuit, the fifth pixel circuit has a first sub-part located in the first sub-region A-R1 of the first sub-display region and the second sub-region B-R1 of the first sub-display region and a second sub-part located in the first sub-region A-R2 of the second sub-display region and the second sub-region B-R2 of the second sub-display region, wherein, the first sub-part and the second sub-part jointly drive the same light-emitting unit (the light-emitting unit may be located in the first sub-region A-R1 of the first sub-display region and the second sub-region B-R1 of the first sub-display region, or may be located in the first sub-region A-R2 of the second sub-display region and the second sub-region B-R2 of the second sub-display region) to emit light. The fifth pixel circuit may be 3T1C, 7T1C, or 8T1C, etc., which is not limited by the present disclosure. In this case, at least some signal lines (such as data lines) need winding designs.

The pixel circuit of the present embodiment (the pixel circuit described herein may be any one of the aforementioned first pixel circuit, second pixel circuit, third pixel circuit, fourth pixel circuit, and fifth pixel circuit) will be described with an example below.

Figure 4D:
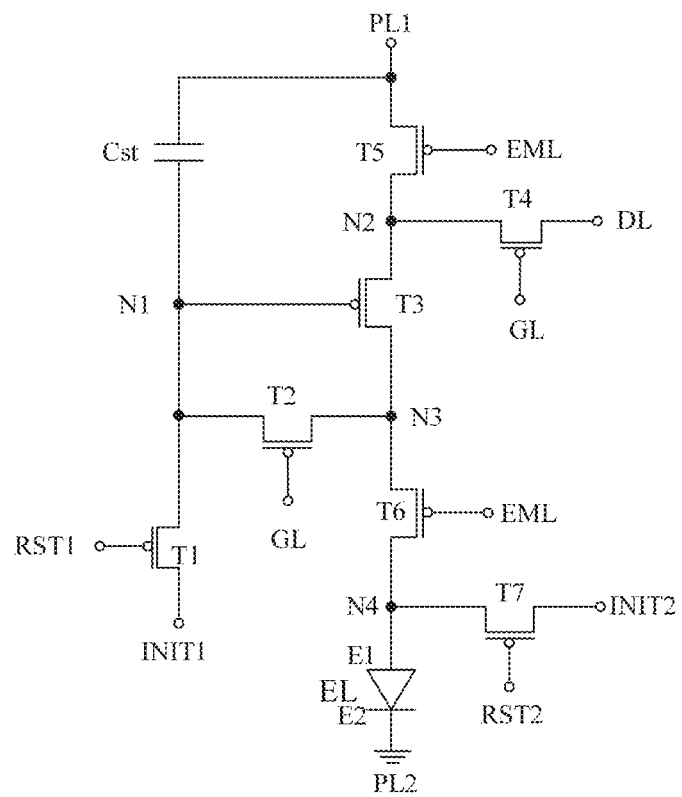
FIG. 4D is an equivalent circuit diagram of a pixel circuit according to at least one embodiment of the present disclosure.
Figure 4E:
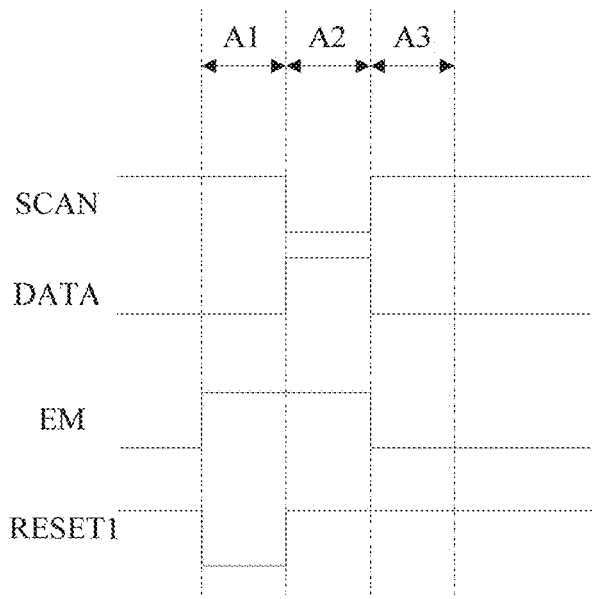
FIG. 4E is an operating timing diagram of the pixel circuit shown in FIG. 4D.

FIG. 4D is an equivalent circuit diagram of a pixel circuit according to at least one embodiment of the present disclosure. FIG. 4E is an operating timing diagram of the pixel circuit shown in FIG. 4D.

In some exemplary implementations, both the pixel circuit of the first sub-region A-R1 of the first sub-display region and the pixel circuit of the second sub-region B-R1 of the first sub-display region may be of a 7T1C structure. However, the embodiments of the present disclosure are not limited to this. For example, the pixel circuit may include other numbers of transistors and capacitors, for example, may be of a structure of 5T1C or 6T1C or the like.

In some exemplary implementations, as shown in FIG. 4D, each pixel circuit includes six switch transistors (T1, T2, and T4 to T7), a drive transistor T3, and a storage capacitor Cst. The six switch transistors are respectively a data writing transistor T4, a threshold compensation transistor T2, a first light-emitting control transistor T5, a second light-emitting control transistor T6, a first reset transistor T1, and a second reset transistor T7. A light-emitting element EL includes a first electrode E1, a second electrode E2, and an organic light-emitting layer located between the first electrode E1 and the second electrode E2. For example, the first electrode E1 may be an anode, and the second electrode E2 may be a cathode.

In some exemplary implementations, the drive transistor and the six switch transistors may be P-type transistors or may be N-type transistors. Adopting the same type of transistors in the pixel circuit may simplify a process flow, reduce a process difficulty of a display substrate, and improve a yield of products. In some possible implementations, the drive transistor and the six switch transistors may include a P-type transistor and an N-type transistor.

In some exemplary implementations, the drive transistor and the six switch transistors may adopt the Low Temperature Poly-Silicon thin film transistor, or the oxide thin film transistor, or the Low Temperature Poly-Silicon thin film transistor and the oxide thin film transistor. An active layer of the Low Temperature Poly-Silicon thin film transistor is made of Low Temperature Poly-Silicon (LTPS), and an active layer of the oxide thin film transistor is made of an oxide semiconductor (Oxide). The Low-temperature Poly-Silicon thin film transistor has advantages such as a high mobility, fast charging, and the like, while the oxide thin film transistor has advantages such as a low leakage current, and the like. The Low Temperature Poly-Silicon thin film transistor and the oxide thin film transistor are integrated on one display substrate to form a Low Temperature Polycrystalline Oxide (LTPO) display substrate, which can utilize advantages of both the Low Temperature Poly-Silicon thin film transistor and the oxide thin film transistor, can achieve low frequency drive, reduce power consumption, and improve display quality.

In some exemplary implementations, as shown in FIG. 4D and FIG. 4E, a display substrate includes a scan line GL, a data line DL, a first power supply line PL1, a second power supply line PL2, a light-emitting control line EML, a first initial signal line INIT1, a second initial signal line INIT2, a first reset control line RST1, and a second reset control line RST2. In some examples, the first power supply line PL1 is configured to provide a constant first voltage signal VDD to a pixel circuit, the second power supply line PL2 is configured to provide a constant second voltage signal VSS to the pixel circuit, and the first voltage signal VDD is greater than the second voltage signal VSS. The scan line GL is configured to provide a scan signal SCAN to the pixel circuit, the data line DL is configured to provide a data signal DATA to the pixel circuit, the light-emitting control line EML is configured to provide an emitting control signal EM to the pixel circuit, the first reset control line RST1 is configured to provide a first reset control signal RESET1 to the pixel circuit, and the second reset control line RST2 is configured to provide a scan signal SCAN to the pixel circuit. For example, in a row of pixel circuits, the second reset control line RST2 may be connected with the scan line GL to be input with a scan signal SCAN. However, the embodiments of the present disclosure are not limited to this. For example, the second reset control line RST2 may be input with a second reset control signal RESET2. For example, in pixel circuits in an n-th row, the first reset control line RST1 may be connected with a scan line GL of pixel circuits in an (n−1)-th row to be inputted with a scan signal SCAN(n−1), that is, a first reset control signal RESET1(n) is the same as the scan signal SCAN(n−1). In this example, the first reset control line RST1 with which the pixel circuits in the n-th row is connected and the second reset control line RST2 with which the pixel circuits in the (n−1)-th row is connected may be an integral structure. Thus, signal lines of the display substrate can be reduced, and a narrow frame of the display substrate can be achieved.

In some examples, the first initial signal line INIT1 and the second initial signal line INIT2 may provide a same initial signal. For example, the first initial signal line INIT1 with which the pixel circuits in the n-th row is connected and the second initial signal line INIT2 with which the pixel circuits in the (n−1)-th row is connected may be an integral structure. However, the embodiments of the present disclosure are not limited to this.

In some exemplary implementations, as shown in FIG. 4D, in the pixel circuit provided by the embodiment, a drive transistor T3 is electrically connected with a light-emitting element EL, and outputs a drive current to drive the light-emitting element EL to emit light under control of a scan signal SCAN, a data signal DATA, a first voltage signal VDD, a second voltage signal VSS and etc. A gate of a data writing transistor T4 is connected with a scan line GL, a first electrode of the data writing transistor T4 is connected with a data line DL, and a second electrode of the data writing transistor T4 is connected with a first electrode of the drive transistor T3. A gate of a threshold compensation transistor T2 is connected with the scan line GL, a first electrode of the threshold compensation transistor T2 is connected with a gate of the drive transistor T3, and a second electrode of the threshold compensation transistor T2 is connected with a second electrode of the drive transistor T3. A gate of a first light-emitting control transistor T5 is connected with a light-emitting control line EML, a first electrode of the first light-emitting control transistor T5 is connected with a first power supply line PL1, and a second electrode of the first light-emitting control transistor T5 is connected with the first electrode of the drive transistor T3. A gate of a second light-emitting control transistor T6 is connected with the light-emitting control line EML, a first electrode of the second light-emitting control transistor T6 is connected with the second electrode of the drive transistor T3, and a second electrode of the second light-emitting control transistor T6 is connected with a first electrode E1 of the light-emitting element EL. A first reset transistor T1 is connected with the gate of the drive transistor T3 and configured to reset the gate of the drive transistor T3, and a second reset transistor T7 is connected with the first electrode E1 of the light-emitting element EL and configured to reset the first electrode E1 of the light-emitting element EL. A gate of the first reset transistor T1 is connected with the first reset control line RST1, a first electrode of the first reset transistor T1 is connected with a first initial signal line INIT1, and a second electrode of the first reset transistor T1 is connected with the gate of the drive transistor T3. A gate of the second reset transistor T7 is connected with a second reset control line RST2, a first electrode of the second reset transistor T7 is connected with a second initial signal line INIT2, and a second electrode of the second reset transistor T7 is connected with the first electrode E1 of the light-emitting element EL. A first electrode of a storage capacitor Cst is connected with the gate of the drive transistor T3, and a second electrode of the storage capacitor Cst is connected with the first power supply line PL1. In this example, a first node N1 is a connection point for the storage capacitor Cst, the first reset transistor T1, the drive transistor T3, and the threshold compensation transistor T2, a second node N2 is a connection point for the first light-emitting control transistor T5, the data writing transistor T4, and the drive transistor T3, a third node N3 is a connection point for the drive transistor T3, the threshold compensation transistor T2, and the second light-emitting control transistor T6, and a fourth node N4 is a connection point for the second light-emitting control transistor T6, the second reset transistor T7, and the light-emitting element EL.

A working process of the pixel circuit illustrated in FIG. 4D will be described below with reference to FIG. 4E. Description will be made by taking a case in which multiple transistors included in the pixel circuit are all P-type transistors as an example.

In some exemplary implementations, as shown in FIG. 4E, in one frame display period, the working process of the pixel circuit of the first structure includes a first stage A1, a second stage A2, and a third stage A3.

The first stage A1 is referred to as a reset stage. A first reset control signal RESET1 provided by the first reset control line RST1 is a low-level signal, so that the first reset transistor T1 is turned on, and an initial signal Vinit provided by the first initial signal line INIT1 is provided to the first node N1 to initialize the first node N1 and clear an original data voltage in the storage capacitor Cst. A scan signal SCAN provided by the scan line GL is a high-level signal, and a light-emitting control signal EM provided by the light-emitting control line EML is a high-level signal, so that the data writing transistor T4, the threshold compensation transistor T2, the first light-emitting control transistor T5, the second light-emitting control transistor T6, and the second reset transistor T7 are turned off. In this stage, the light-emitting element EL does not emit light.

The second stage A2 is referred to as a data writing stage or a threshold compensation stage. A scan signal SCAN provided by the scan line GL is a low-level signal, a first reset control signal RESET1 provided by the first reset control line RST1 and an emitting control signal EM provided by the light-emitting control line EML are both high-level signals, and the data line DL outputs a data signal DATA. In this stage, the second electrode of the storage capacitor Cst is at a low level, so that the drive transistor T3 is turned on. The scan signal SCAN is a low-level signal, so that the threshold compensation transistor T2, the data writing transistor T4, and the second reset transistor T7 are turned on. The threshold compensation transistor T2 and the data writing transistor T4 are turned on, so that a data voltage Vdata output by the data line DL is provided to the first node N1 through the second node N2, the turned-on drive transistor T3, the third node N3, and the turned-on threshold compensation transistor T2, and the storage capacitor Cst is charged with a difference between the data voltage Vdata output by the data line DL and a threshold voltage of the drive transistor T3. A voltage of the second electrode (that is, the first node N1) of the storage capacitor Cst is Vdata−|Vth|, wherein Vdata is the data voltage output by the data line DL, and Vth is the threshold voltage of the drive transistor T3. The second reset transistor T7 is turned on, so that a initial signal Vinit provided by the second initial signal line INIT2 is provided to the first electrode E1 of the light-emitting element EL to initialize (reset) the first electrode E1 of the light-emitting element EL and clear a pre-stored voltage therein, so as to complete initialization, thereby ensuring that the light-emitting element EL does not emit light. The first reset control signal RESET1 provided by the first reset control line RST1 is a high-level signal, so that the first reset transistor T1 is turned off. The light-emitting control signal EM provided by the light-emitting control signal line EML is a high-level signal, so that the first light-emitting control transistor T5 and the second light-emitting control transistor T6 are turned off.

The third stage A3 is referred to as a light-emitting stage. A light-emitting control signal EM provided by the light-emitting control signal line EML is a low-level signal, and a scan signal SCAN provided by the scan line GL and a first reset control signal RESET1 provided by the first reset control line RST1 are high-level signals. The light-emitting control signal EM provided by the light-emitting control signal line EML is a low-level signal, so that the first light-emitting control transistor T5 and the second emitting control transistor T6 are turned on, and a first voltage signal VDD output by the first power supply line PL1 provides a drive voltage to the first electrode E1 of the light-emitting element EL through the turned-on first light-emitting control transistor T5, the drive transistor T3, and the second light-emitting control transistor T6 to drive the light-emitting element EL to emit light.

In a drive process of the pixel circuit, a drive current flowing through the drive transistor T3 is determined by a voltage difference between the gate and the first electrode of the drive transistor T3. Since the voltage of the first node N1 is Vdata-|Vth|, the drive current of the drive transistor T3 is as follows.

$$I=K^*(Vgs-Vth)^2=K^*[(Vdd-Vdata+|Vth|)-Vth]^2=K^*[(Vdd-Vdata]^2.$$

Herein, I is the drive current flowing through the drive transistor T3, that is, the drive current for driving the light-emitting element EL; K is a constant; Vgs is the voltage difference between the gate of and the first electrode of the drive transistor T3; Vth is the threshold voltage of the drive transistor T3; Vdata is the data voltage output by the data line DL; and VDD is the first voltage signal output by the first power supply line PL1.

It may be seen from the above formula that a current flowing through the light-emitting element EL is irrelevant to the threshold voltage of the drive transistor T3. Therefore, the pixel circuit of this embodiment can better compensate the threshold voltage of the drive transistor T3.

Figure 5:
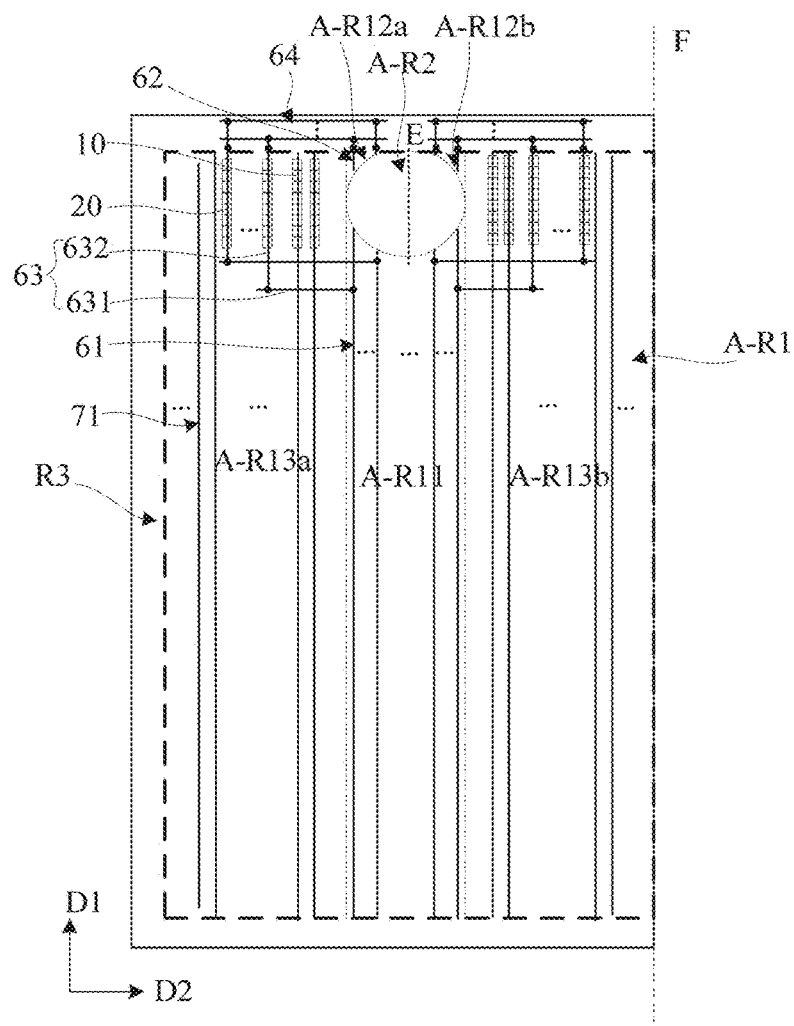
FIG. 5 is a schematic diagram of a layout of data lines of a first display region according to at least one embodiment of the present disclosure.

FIG. 5 is a schematic diagram of a partial wiring mode of data lines of a first display region A. In FIG. 5, only several data lines and several first pixel circuits 10 and second pixel circuits 20 are taken as an example for illustration. In this example, the display substrate has a central axis in the second direction D2, the central axis overlaps with the axis F, and the display substrate may be symmetrical about the central axis. Description will be made below by taking the data line arrangement of the first display region A as an example. Reference may be made to the data line arrangement of the first display region A for the data line arrangement of the second display region B, so it will not be described repeatedly herein. The structure shown in the present implementation may be combined with structures shown in other implementations as appropriate.

In some exemplary implementations, the frame region R3 includes a data drive chip region which may include an integrated circuit configured to be connected with a plurality of data lines of a display region. The first sub-region A-R2 of the second sub-display region may be located on a side of the first sub-region A-R1 of the first sub-display region away from the data drive chip region.

In some exemplary implementations, the first sub-display region includes a first part of the first sub-display region and a second part of the first sub-display region located on opposite sides of the second sub-display region in the first direction D1, and a third part of the first sub-display region located on opposite sides of the second sub-display region in the second direction D2.

Exemplarily, taking the first sub-region A-R1 of the first sub-display region as an example, as shown in FIG. 1 and FIG. 5, the first sub-region A-R1 of the first sub-display region includes: a first part A-R11 of the first sub-region of the first sub-display region and a second part A-R12 of the first sub-region of the first sub-display region located on opposite sides of the first sub-region A-R2 of the second sub-display region along the first direction D1, and a third part A-R13 of the first sub-region of the first sub-display region located on opposite sides of the first sub-region A-R2 of the second sub-display region along the second direction D2. The third part of the first sub-region of the first sub-display region includes a first sub-part A-R13a of the third part of the first sub-region of the first sub-display region and a second sub-part A-R13b of the third part of the first sub-region of the first sub-display region. The first part A-R11 of the first sub-region of the first sub-display region is located on the lower side of the first sub-region A-R2 of the second sub-display region, and the second part A-R12 of the first sub-region of the first sub-display region is located on the upper side of the first sub-region A-R2 of the second sub-display region. The first part A-R11 of the first sub-region of the first sub-display region and the second part A-R12 of the first sub-region of the first sub-display region are separated by the first sub-region A-R2 of the second sub-display region in the first direction D1, the third part A-R13 of the first sub-region of the first sub-display region is separated by the first sub-region A-R2 of the second sub-display region in the second direction D2, that is, the first sub-part A-R13a of the third part of the first sub-region of the first sub-display region and the second sub-part A-R13b of the third part of the first sub-region of the first sub-display region are located on opposite sides of the first sub-region A-R2 of the second sub-display region in the second direction D2. However, this embodiment is not limited thereto. For example, the second part A-R12 of the first sub-region of the first sub-display region may be connected in the second direction D2, or may be separated by the first sub-region A-R2 of the second sub-display region. The first sub-part A-R13a of the third part of the first sub-region of the first sub-display region is on the left side of the first sub-region A-R2 of the second sub-display region, and the second sub-part A-R13b of the third part of the first sub-region of the first sub-display region is on the right side of the first sub-region A-R2 of the second sub-display region. The first sub-part A-R13a of the third part of the first sub-region of the first sub-display region and the second sub-part A-R13b of the third part of the first sub-region of the first sub-display region are separated by the first part A-R11 of the first sub-region of the first sub-display region, the first sub-region A-R2 of the second sub-display region and the second part A-R12 of the first sub-region of the first sub-display region. The first sub-part A-R13a of the third part of the first sub-region of the first sub-display region communicates with the first part A-R11 of the first sub-region of the first sub-display region and the second part A-R12a of the first sub-region of the first sub-display region, and the second sub-part A-R13b of the third part of the first sub-region of the first sub-display region communicates with the first part A-R11 of the first sub-region of the first sub-display region and the second part A-R12b of the first sub-region of the first sub-display region. The second sub-region B-R1 of the first sub-display region have a similar structure, and will not be described here. The first part A-R11 of the first sub-region of the first sub-display region and the first part B-R11 of the second sub-region of the first sub-display region form the first part of the first sub-display region, the second part A-R12 of the first sub-region of the first sub-display region and the second part B-R12 of the second sub-region of the first sub-display region form the second part of the first sub-display region, and the first sub-part A-R13*a* of the third part of the first sub-region of the first sub-display region, the second sub-part A-R13*b* of the third part of the first sub-region of the first sub-display region, the first sub-part B-R13*a* of the third part of the second sub-region of the first sub-display region and the second sub-part B-R13*b* of the third part of the second sub-region of the first sub-display region form the third part of the first sub-display region.

In some exemplary implementations, as shown in FIG. 1 and FIG. 5, the first sub-region A-R1 of the first sub-display region is provided with a plurality of first data lines, and the first sub-region A-R1 of the first sub-display region includes the first part A-R11 of the first sub-region of the first sub-display region, the second part A-R12 of the first sub-region of the first sub-display region and the third part A-R13 of the first sub-region of the first sub-display region. The frame region R3 is provided with a plurality of data connection lines 64. At least one first data line is connected with at least one pixel circuit of the first part A-R11 of the first sub-region of the first sub-display region, and is connected with at least one pixel circuit of the second part A-R12 of the first sub-region of the first sub-display region through at least one data connection line 64. For example, at least one first data line is connected with a column of first pixel circuits of the first part A-R11 of the first sub-region of the first sub-display region and a column of first pixel circuits of the second part A-R12 of the first sub-region of the first sub-display region.

In some exemplary implementations, as shown in FIG. 1 and FIG. 5, at least one first data line includes: a first sub-data line 61, a second sub-data line 62, and a third sub-data line 63. The third sub-data line 63 is connected between the first sub-data line 61 and the second sub-data line 62. The first sub-data line 61 is located in the first part A-R11 of the first sub-region of the first sub-display region and is connected with a column of first pixel circuits of the first part A-R11 of the first sub-region of the first sub-display region. The second sub-data line 62 is located in the second part A-R12 of the first sub-region of the first sub-display region and is connected with a column of first pixel circuits of the second part A-R12 of the first sub-region of the first sub-display region. The third sub-data line 63 is located in the third part A-R13 of the first sub-region of the first sub-display region, extends to the first part A-R11 of the first sub-region of the first sub-display region to be connected with the first sub-data line 61, and is connected with the data connection line 64 of the frame region R3. The third sub-data line 63 is connected with a plurality of second pixel circuits arranged along the first direction D1 in the third part A-R13 of the first sub-region of the first sub-display region. The data connection line 64 of the frame region R3 is connected with the second sub-data line 62 of the second part A-R12 of the first sub-region of the first sub-display region. In this example, a data signal provided from the drive chip region may be transmitted to the second sub-data line 62 through the first sub-data line 61, the third sub-data line 63, and the data connection line 64. The data signal is provided to a pixel circuit A-R12 of the second part of the first sub-region of the first sub-display region after the third sub-data line 63 is wound in the third part A-R13 of the first sub-region of the first sub-display region, preventing a direct wiring of a data line in the first sub-region A-R2 of the second sub-display region and the second sub-region B-R2 of the second sub-display region from affecting a light transmittance of the first sub-region A-R2 of the second sub-display region and the second sub-region B-R2 of the second sub-display region, thereby improving a display effect.

In some exemplary implementations, the first sub-region A-R1 of the first sub-display region is provided with pixel circuits arranged in an array. For example, the third part A-R13 of the first sub-region of the first sub-display region is provided with n1 columns of pixel circuits, the first part A-R11 of the first sub-region of the first sub-display region is provided with n2 columns of pixel circuits, and the second part A-R12 of the first sub-region of the first sub-display region is provided with n3 columns of pixel circuits in total. In this example, n3 may be less than n2. However, the embodiments of the present disclosure are not limited to this. For example, n3 may be equal to n2.

Figure 6:
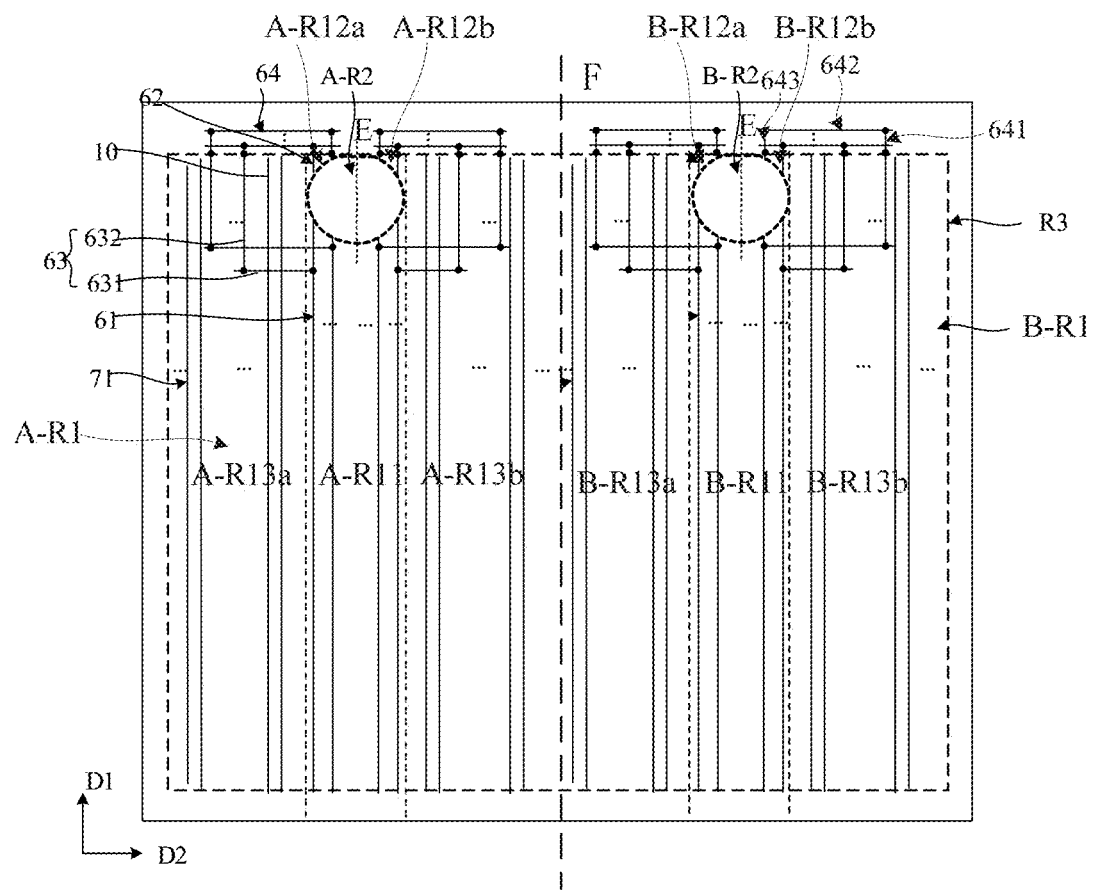
FIG. 6 is a schematic diagram of a partial layout of data lines of a display substrate according to at least one embodiment of the present disclosure.

In some exemplary embodiments, as shown in FIG. 5 and FIG. 6, in the first part A-R11 of the first sub-region of the first sub-display region, the first sub-data line 61 extends along the first direction D1, and the plurality of first sub-data lines 61 are sequentially arranged along the second direction D2. A first sub-data line 61 may be connected with a column of first pixel circuits 10 and is configured to provide a data signal introduced from the drive chip region to a corresponding first pixel circuit 10. Or, a first sub-data line 61 may be connected with a column of second pixel circuits. In the second part A-R12 of the first sub-region of the first sub-display region, the second sub-data lines 62 may extend along the first direction D1, and the plurality of second sub-data lines 62 are sequentially arranged along the second direction D2. A second sub-data line 62 may be connected with a column of first pixel circuits 10 or a column of second pixel circuits 20 in the second part A-R12 of the first sub-region of the first sub-display region. The first sub-data line 61 and the second sub-data line 62 are separated by the first sub-region A-R2 of the second sub-display region. In some examples, the first sub-data line 61 and the second sub-data line 62 may be of a same-layer structure.

In some exemplary implementations, as shown in FIG. 5 and FIG. 6, in the third part A-R13 of the first sub-region of the first sub-display region, the third sub-data line 63 includes a first line segment 631 and a second line segment 632 connected with each other. The first line segment 631 extends along the second direction D2, and a plurality of first line segments 631 are arranged in sequence along the first direction D1. The second line segment 632 extends along the first direction D1, and a plurality of second line segments 632 are arranged in sequence along the second direction D2. One end of the first line segment 631 extends to the first part A-R11 of the first sub-region of the first sub-display region and is connected with the first sub-data line 61, and the other end of the first line segment 631 is connected with the second line segment 632 in the third part A-R13 of the first sub-region of the first sub-display region. The second line segment 632 is connected with a plurality of second pixel circuits 20 arranged along the first direction D1 in the third part A-R13 of the first sub-region of the first sub-display region. In some examples, the plurality of second pixel circuits 20 with which the second line segment 632 is connected are connected with the second light-emitting element 40 of the first sub-region A-R2 of the second sub-display region. However, the embodiments of the present disclosure are not limited to this. For example, the plurality of second pixel circuits 20 with which the second line segment 632 is connected may be dummy pixel circuits, i.e., may not be connected with light-emitting elements. In some examples, the first line segment 631 and the second line segment 632 may be of a different-layer structure. For example, the second line segment 632 and the first sub-data line 61 may be of a same-layer structure, and the first line segment 631 and the first sub-data line 61 may be of a different-layer structure. In some examples, the first line segment 631 and the second line segment 632 may be of an integral structure, and are of a different-layer structure with the first sub-data line 61. However, the embodiments of the present disclosure are not limited to this.

In some exemplary implementations, as shown in FIG. 5 and FIG. 6, a plurality of data connection lines 64 are located on a side of the first sub-region A-R2 of the second sub-display region away from the drive chip region, for example, within an upper frame region, thereby expanding the wiring space and improving the PPI. At least one data connection line 64 includes a first sub-data connection line 641, a second sub-data connection line 642, and a third sub-data connection line 643. The first sub-data connection line 641 and the third sub-data connection line 643 extend along the first direction D1, and the second sub-data connection line 642 extends along the second direction D2. For example, lengths of a plurality of second sub-data connection lines 642 along the second direction D2 may be the same. A plurality of first sub-data connection lines 641 and a plurality of third sub-data connection lines 643 are sequentially arranged along the second direction D2, and a plurality of second sub-data connection lines 642 are sequentially arranged along the first direction D1. The second sub-data connection line 642 is connected with the first sub-data connection line 641 and the third sub-data connection line 643 respectively. The first sub-data connection line 641 is connected with the second line segment 632 of the third sub-data line 63, and the third sub-data connection line 643 is connected with the second sub-data line 62. In some examples, the first sub-data connection line 641 and the third sub-data connection line 643 are of a same-layer structure, and are of a different-layer structure with the second sub-data connection line 642. The second sub-data connection line 642 may be of a same-layer structure as the second line segment 632 of the third sub-data line 63 and the second sub-data line 62. However, the embodiments of the present disclosure are not limited to this.

In some exemplary implementations, the orthographic projection of the data connection line (i.e., the second sub-data connection line 642) extending in the second direction D2 on the display substrate and the orthographic projection of the axis F on the display substrate do not overlap, thereby avoiding defects of data lines caused by repeated folding, such as the short circuit, etc., and improving reliability.

In some exemplary implementations, a first light-emitting element connected with a first pixel circuit connected with the first sub-data line 61 and a second light-emitting element connected with a second pixel circuit connected with a corresponding third sub-data line 63 may be located in a same column. The first light-emitting element connected with the first pixel circuit connected with the first sub-data line 61 and a first light-emitting element connected with a first pixel circuit connected with a corresponding second sub-data line 62 may be located in a same column. However, the embodiments of the present disclosure are not limited to this.

In some exemplary implementations, as shown in FIG. 5 and FIG. 6, first line segments 631 of a plurality of third sub-data lines 63 are arranged along the first direction D1, a first line segment 631 closer to the first sub-region A-R2 of the second sub-display region is connected with a first sub-data line 61 closer to the central axis F; and the first line segment 631 closer to the first sub-region A-R2 of the second sub-display region is connected with a second line segment 632 farther away from the central axis F. Along the second direction D2 away from the first sub-region A-R2 of the second sub-display region, lengths of a plurality of second line segments 632 in the first direction D2 gradually decrease. Along the first direction D1 away from the first sub-region A-R2 of the second sub-display region, lengths of a plurality of first line segments 631 in the second direction D2 gradually decrease. However, the embodiments of the present disclosure are not limited to this. For example, along the first direction D1 away from the first sub-region A-R2 of the second sub-display region, the lengths of the plurality of first line segments 631 in the second direction D2 are unchanged. For example, along the second direction D2 away from the first sub-region A-R2 of the second sub-display region, the lengths of the plurality of second line segments 632 in the first direction D1 gradually increase.

In some exemplary implementations, the first sub-region A-R1 of the first sub-display region is further provided with a plurality of second data lines 71. The plurality of second data lines 71 each extend along the first direction D1 and are sequentially arranged along the second direction D2. Winding of the second data lines 71 in the first sub-region A-R1 of the first sub-display region do not need to be designed. At least one second data line 71 may be connected with a column of pixel circuits (first pixel circuits or second pixel circuits). In some exemplary implementations, in the third part A-R13 of the first sub-region of the first sub-display region, for a row of second pixel circuits 20, a portion of the second pixel circuits 20 is connected with a second segment 632 of the third sub-data line 63, another portion may be connected with a second data line 71, and the second segment 632 of the third sub-data line 63 is disconnected from the second data line 71.

In some exemplary implementations, the orthographic projection of the sub-data line (i.e., the first line segment 631 of the third sub-data line 63) extending in the second direction D2 on the display substrate does not overlap with the orthographic projection of the axis F on the display substrate, thereby avoiding defects of data lines caused by repeated folding, such as the short circuit, etc., and improving reliability.

In some exemplary implementations, the first display region A and the second display region B may be disposed symmetrically about the axis F.

In some exemplary implementations, data line windings around the first sub-region A-R2 of the second sub-display region are arranged symmetrically with respect to the central axis E of the first sub-region A-R2 of the second sub-display region along the second direction D2. The data line windings around the second sub-region B-R2 of the second sub-display region are arranged symmetrically with respect to the center axis E of the first sub-region A-R2 of the second sub-display region along the second direction D2.

Figure 7:
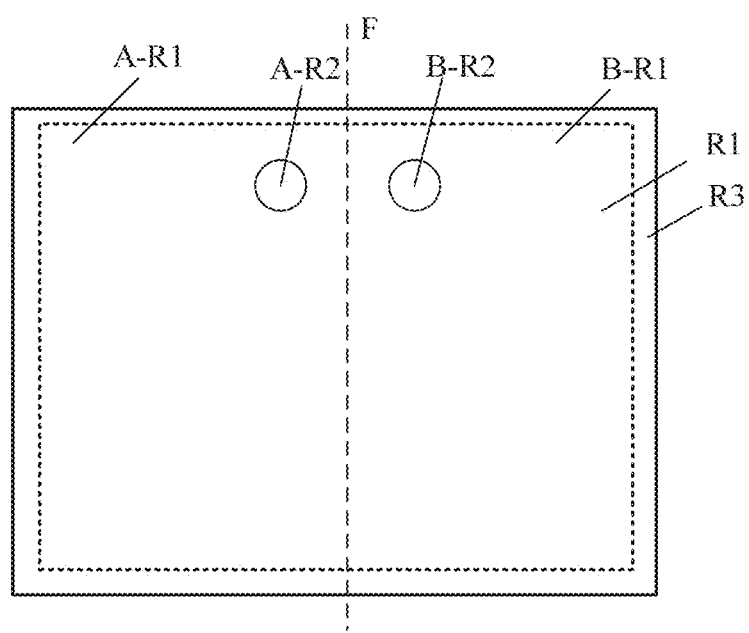
FIG. 7 is another schematic diagram of a display substrate according to at least one embodiment of the present disclosure.
Figure 8:
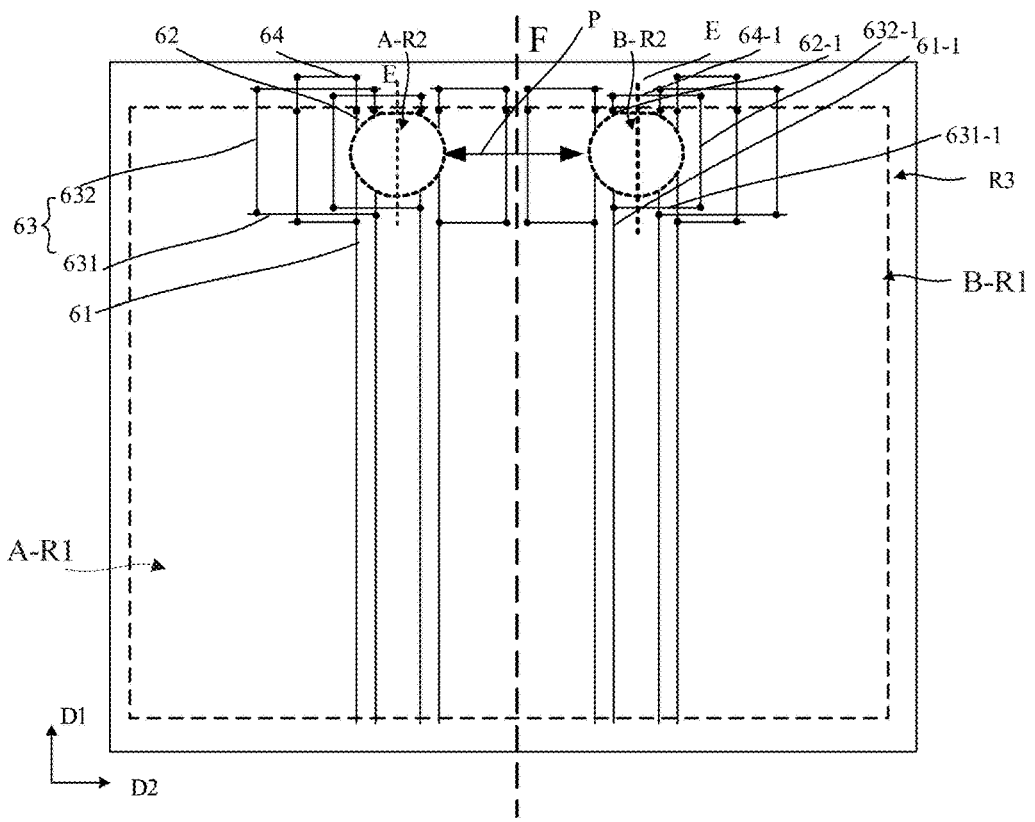
FIG. 8 is a schematic diagram of another partial layout of data lines of a display substrate according to at least one embodiment of the present disclosure.

In some exemplary implementations, as shown in FIG. 7 and FIG. 8, the first sub-region A-R2 of the second sub-display region is provided to a side of the first display region A near the axis F. The second sub-region B-R2 of the second sub-display region is provided to a side of the second display region B near the axis F.

In some exemplary implementations, the first sub-region A-R2 of the second sub-display region has a center line (geometric center) E along the second direction D2, as shown in FIG. 8. Due to the limitation of wiring space near the axis F, the first sub-region A-R1 of the first sub-display region is provided with at least part of the first data lines, and this part of the first data lines includes a second sub-data line 62 (denoted by 62-1) and a first sub-data line 61 (denoted by 61-1) located on one side of the center line E and a second line segment 632 (denoted by 632-1) located on the other side of the center line E. A first line segment 631 denoted by 631-1) of this part of first data lines overlaps with the center line E, and a data connection line 64 denoted by 64-1) of this part of first data lines overlaps with the center line E. In this embodiment, as shown in FIG. 8, the first sub-region A-R1 of the first sub-display region may also be provided with another part of the first data lines, various sub-data lines of this another part of the first data lines are located between the center line E and the axis F. The second sub-region B-R2 of the second sub-display region may have the same wiring mode, and will not be repeated here.

In some exemplary implementations, in order to make the total lengths of data lines consistent and achieve a more uniform display effect, the data connection lines 64-1 in the aforementioned part of the first data lines are closer to the first sub-region A-R2 of the second sub-display region than other data connection lines 64 located on the other side of the central line E, the second line segments 632-1 in the aforementioned part of the first data lines are closer to the first sub-region A-R2 of the second sub-display region than other second line segments 632 located on the other side of the center line E, and the first line segments 631-1 in the aforementioned part of the first data lines are closer to the first sub-region A-R2 of the second sub-display region than other first line segments 631 located on the other side of the center line E.

In some exemplary implementations, the first display region A and the second display region B are symmetrically disposed, and an even number of third sub-data line 63 windings are disposed between the first sub-region A-R2 of the second sub-display region and the second sub-region B-R2 of the second sub-display region.

Figure 9:
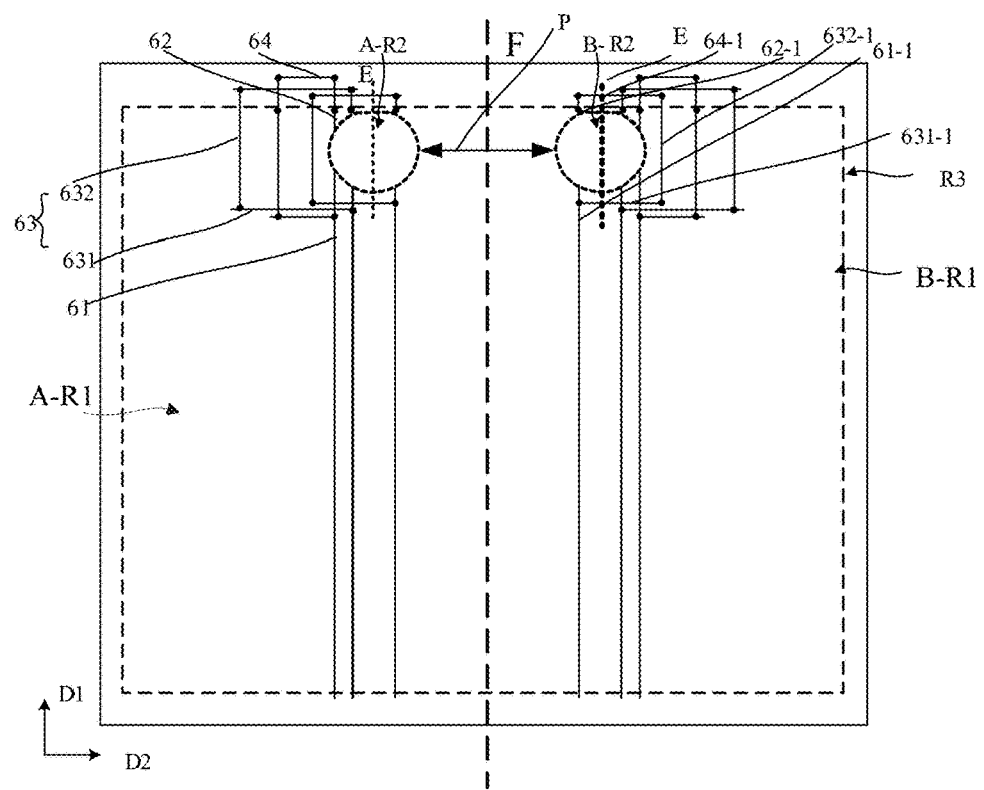
FIG. 9 is a schematic diagram of a further partial layout of data lines of a display substrate according to at least one embodiment of the present disclosure.

In some exemplary implementations, as shown in FIG. 9, there is no third sub-data line 63 winding between the first sub-region A-R2 of the second sub-display region and the second sub-region B-R2 of the second sub-display region (the range of arrow P), so that the first sub-region A-R2 of the second sub-display region and the second sub-region B-R2 of the second sub-display region B-R2 can be disposed closer. That is, the cameras of the first sub-region A-R2 of the second sub-display region and the second sub-region B-R2 of the second sub-display region are closer to the axis F, but do not overlap with the axis F, which is beneficial to optimizing image acquisition.

Figure 10:
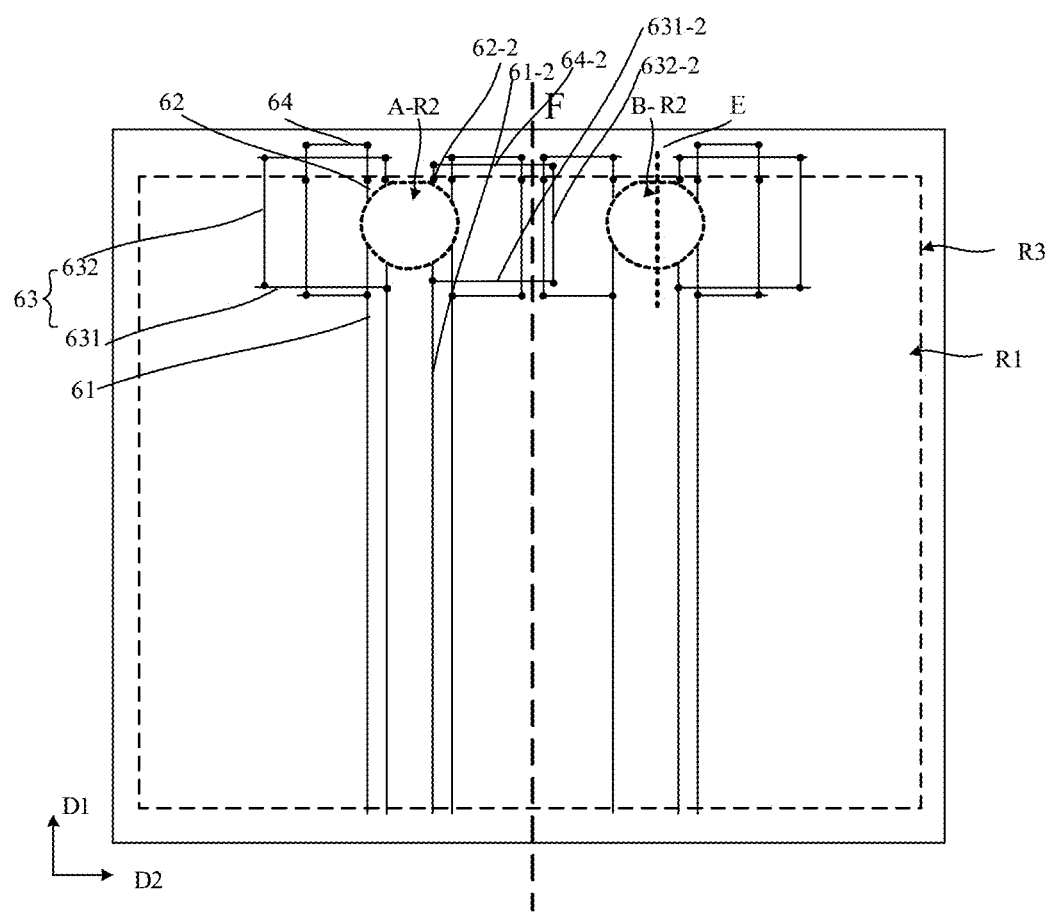
FIG. 10 is a schematic diagram of a further partial layout of data lines of a display substrate according to at least one embodiment of the present disclosure.

In some exemplary implementations, as shown in FIG. 10, the display substrate may be provided with at least one first data line, the first data line is used to drive the pixel column located in the first display region A, but has a data line winding located in the second display region B, or it is used to drive the pixel column located in the second display region B, but has a data line winding located in the first display region A. Exemplarily, as shown in FIG. 10, the second sub-data line 62-2 and the first sub-data line 61-2 are both located in the first display region A, the second line segment 632-2 is located in the second display region B, the first line segment 631-2 and the data connection line 64-2 both cross the axis F, that is, the first line segment 631-2 and the data connection line 64-2 both have an overlapping region with the axis F, so that the total lengths of various data lines of the left and right winding lines of the first sub-region A-R2 of the second sub-display region and the second sub-region B-R2 of the second sub-display region are substantially same, and thereby the resistance values of various data lines are substantially same, thus achieving a uniform display effect.

In some exemplary implementations, area sizes of the first sub-region A-R2 of the second sub-display region and the second sub-region B-R2 of the second sub-display region may be nearly the same, or the area sizes of the first sub-region A-R2 of the second sub-display region and the second sub-region B-R2 of the second sub-display region may be different. When the area sizes of the first sub-region A-R2 of the second sub-display region and the second sub-region B-R2 of the second sub-display region are different, the data line wiring may be designed for compensation according to the aforementioned design rule to optimize the actual display effect. In this case, different sensors may be provided respectively in the first sub-region A-R2 of the second sub-display region and the second sub-region B-R2 of the second sub-display region, according to actual needs, for example, the two image acquisition sensors with different sizes, i.e., a primary image acquisition sensor and a secondary image acquisition sensor, may be provided respectively in the first sub-region A-R2 of the second sub-display region and the second sub-region B-R2 of the second sub-display region.

In some exemplary implementations, both the first sub-region A-R2 of the second sub-display region and the second sub-region B-R2 of the second sub-display region may be provided with one or more different sensors, the sensors include but are not limited to: ① an image acquisition sensor; ② a face recognition sensor (3D imaging technology may be adopted, exemplary, such as structured light 3D imaging method or time-of-flight method, and a face recognition sensor may include multiple cameras and depth sensors); ③ a fingerprint recognition sensor, and the like. The first sub-region A-R2 of the second sub-display region and the second sub-region B-R2 of the second sub-display region may be provided with one or more sensors among a plurality of different sensors using an arrangement and/or combination manner according to actual needs. Exemplarily, the first sub-region A-R2 of the second sub-display region may be provided with a plurality of sensors, such as, one image acquisition sensor+one face recognition sensor; the second sub-region B-R2 of the second sub-display region may be provided with a fingerprint recognition sensor or the like.

In some exemplary implementations, the first sub-region A-R2 of the second sub-display region is located on a side of the first display region A away from the data drive chip (i.e., a side near the upper frame of the display substrate), and the second sub-region B-R2 of the second sub-display region is located on a side of the second display region B away from the data drive chip (i.e., a side near the upper frame of the display substrate). However, the embodiments of the present disclosure are not limited to this. The first sub-region A-R2 of the second sub-display region and the second sub-region B-R2 of the second sub-display region of the second sub-display region may be disposed at any position of the display substrate according to actual needs.

Figure 11:
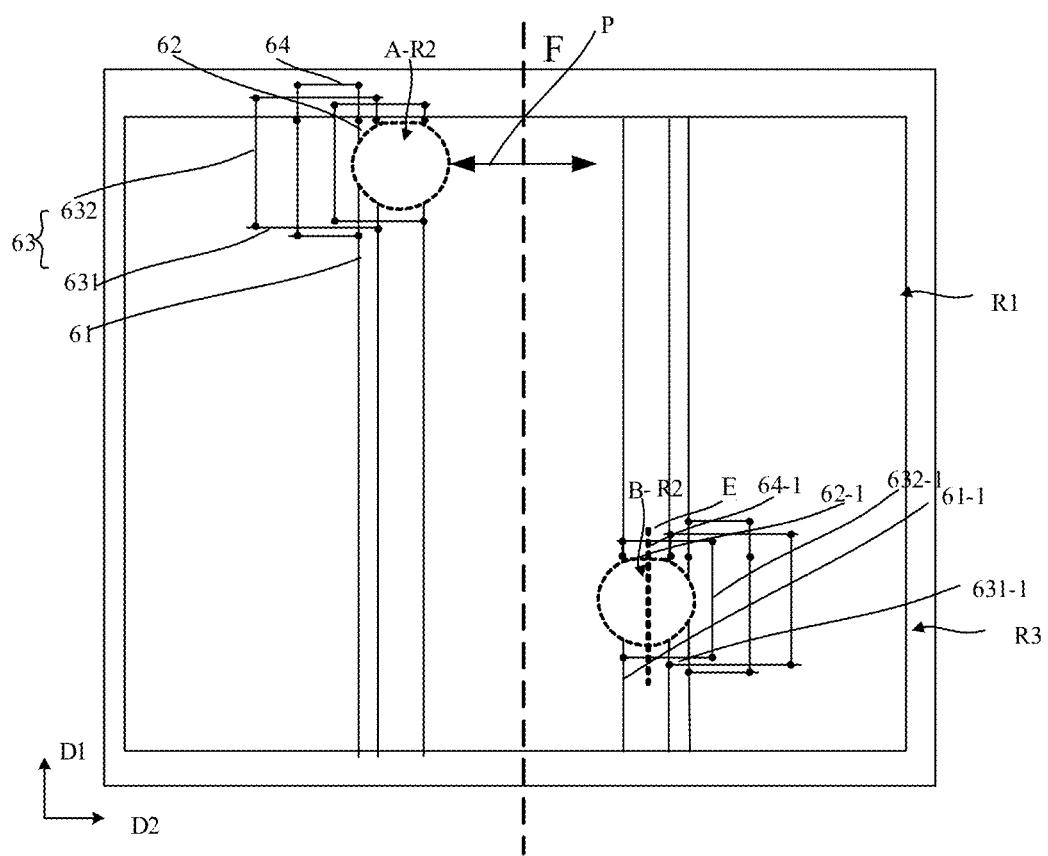
FIG. 11 is a schematic diagram of a further partial layout of data lines of a display substrate according to at least one embodiment of the present disclosure.

In some exemplary implementations, as shown in FIG. 11, the first sub-region A-R2 of the second sub-display region is located on a side of the first display region A away from the data drive chip (i.e., a side near the upper frame of the display substrate), and the second sub-region B-R2 of the second sub-display region is located on a side of the second display region B near the data drive chip (i.e., a side near the lower frame of the display substrate); or, the first sub-region A-R2 of the second sub-display region is located on a side of the first display region A near the data drive chip (i.e., a side near the lower frame of the display substrate), and the second sub-region B-R2 of the second sub-display region is located on a side of the second display region B away from the data drive chip (i.e., a side near the upper frame of the display substrate).

Figure 12:
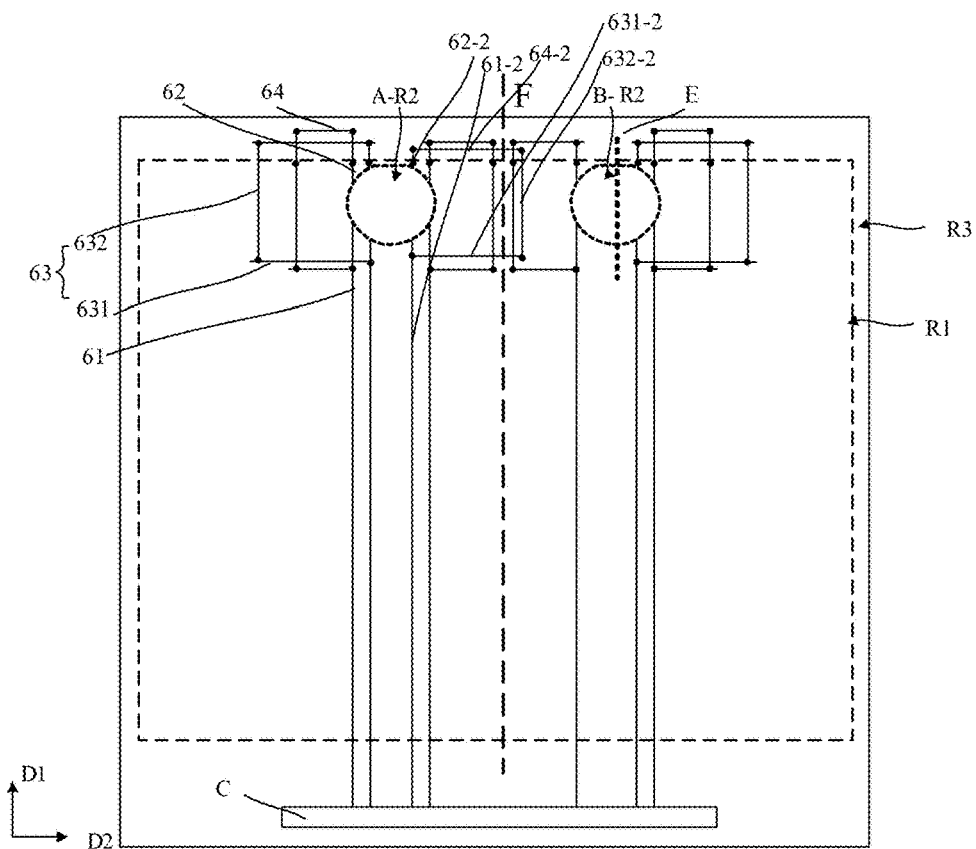
FIG. 12 is a schematic diagram of a further partial layout of data lines of a display substrate according to at least one embodiment of the present disclosure.

In some exemplary implementations, the display substrate includes a data drive chip, and the data drive chip is respectively connected with data lines of the first display region and the second display region. As shown in FIG. 12, the first sub-region A-R2 of the second sub-display region and the second sub-region B-R2 of the second sub-display region are both close to the upper frame region, and the display substrate further includes a data drive chip (Drive IC) located in the lower frame region. In this case, the first sub-region A-R2 of the second sub-display region and the second sub-region B-R2 of the second sub-display region cover respectively a plurality of different data lines.

Figure 13:
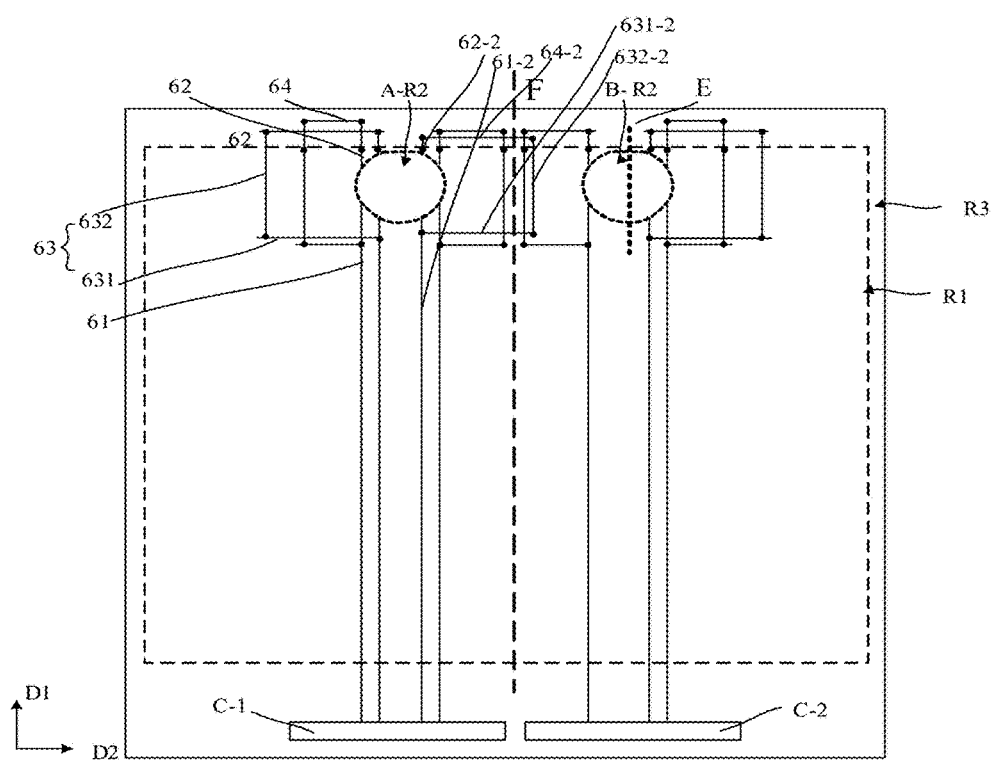
FIG. 13 is a schematic diagram of a further partial layout of data lines of a display substrate according to at least one embodiment of the present disclosure.

In some exemplary implementations, as shown in FIG. 13, the display substrate includes two data drive chips C-1, C-2, wherein one data drive chip C-1 is connected with a data line of the first display region A, and the other data drive chip C-2 is connected with a data line of the second display region B.

Figure 14:
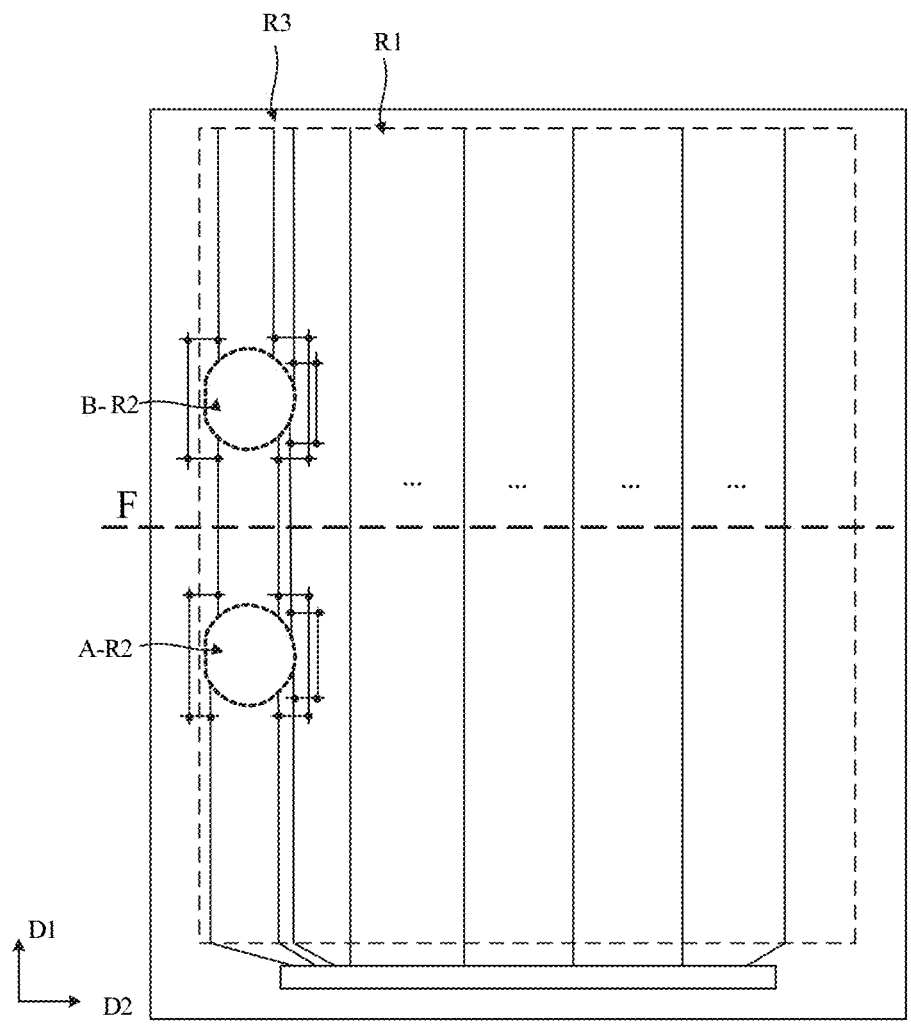
FIG. 14 is a schematic diagram of a further partial layout of data lines of a display substrate according to at least one embodiment of the present disclosure.

In some exemplary implementations, as shown in FIG. 14, the first sub-region A-R2 of the second sub-display region and the second sub-region B-R2 of the second sub-display region are disposed along the first direction D1, and the first sub-region A-R2 of the second sub-display region and the second sub-region B-R2 of the second sub-display region are connected with at least one same data line. Exemplarily, the first sub-region A-R2 of the second sub-display region and the second sub-region B-R2 of the second sub-display region are located on the same several columns of data lines, in this case, those columns of data lines need to be wound twice. The winding rule are the same as that of the above embodiments, to make the total lengths of the data lines consistent as much as possible, so as to improve the display uniformity. In some exemplary implementations, a partial winding of at least one column of data lines located near the frame region may be located in the frame region.

Figure 15:
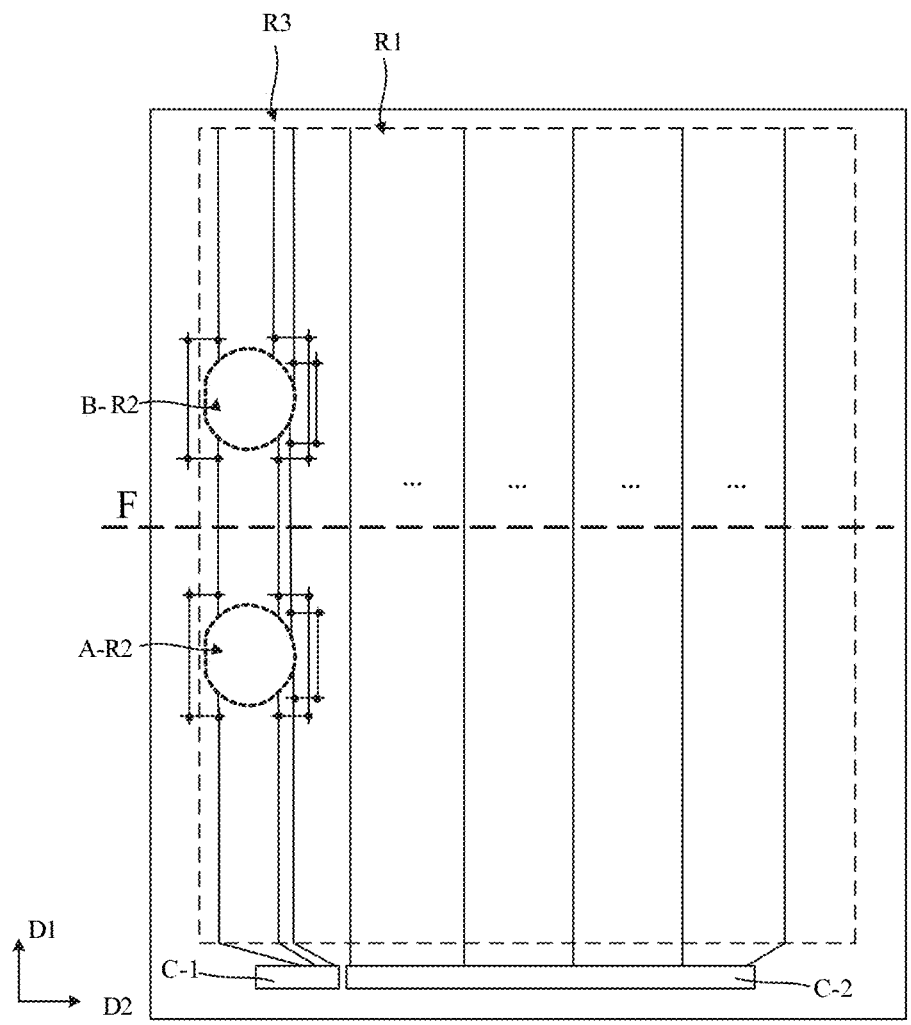
FIG. 15 is a schematic diagram of a further partial layout of data lines of a display substrate according to at least one embodiment of the present disclosure.
Figure 16:
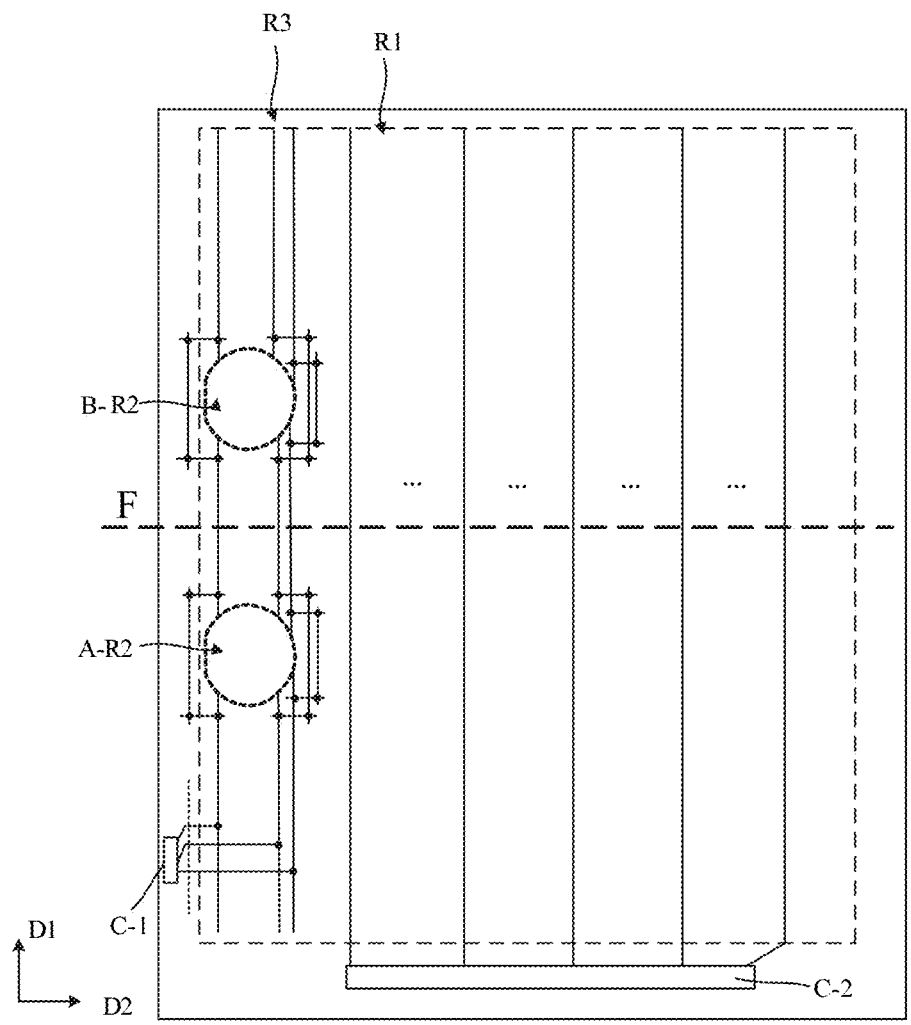
FIG. 16 is a schematic diagram of a further partial layout of data lines of a display substrate according to at least one embodiment of the present disclosure.

In some exemplary implementations, as shown in FIG. 15 and FIG. 16, the display substrate includes two data drive chips, wherein one data drive chip is used to drive a first data line, and the other data drive chip is used to drive a second data line. The first data line has a winding at the first sub-region A-R2 of the second sub-display region and the second sub-region B-R2 of the second sub-display region, and the second data line does not have a winding. In this case, as shown in FIG. 15, the two data drive chips may be located on a same side of the display substrate, or as shown in FIG. 16, the two data drive chips may be located on different sides of the display substrate. As shown in FIG. 15 and FIG. 16, both data drive chips may be bent to the back side of the display substrate to realize a narrow frame.

In some exemplary implementations, as shown in FIG. 16, for the lengths of the data lines connected with the data drive chip C-1, there is a compensation design. For some data lines with shorter lengths, they should be disposed in a region relatively far away from C-1, or compensated by increasing resistance through curved winding; on the contrary, for some data lines with longer lengths, the width of data lines may be thickened in the peripheral region to reduce the resistance, so that the total lengths of data lines driving the whole column are substantially same, in order to achieve substantially same resistance values and a uniform display effect.

Figure 17:
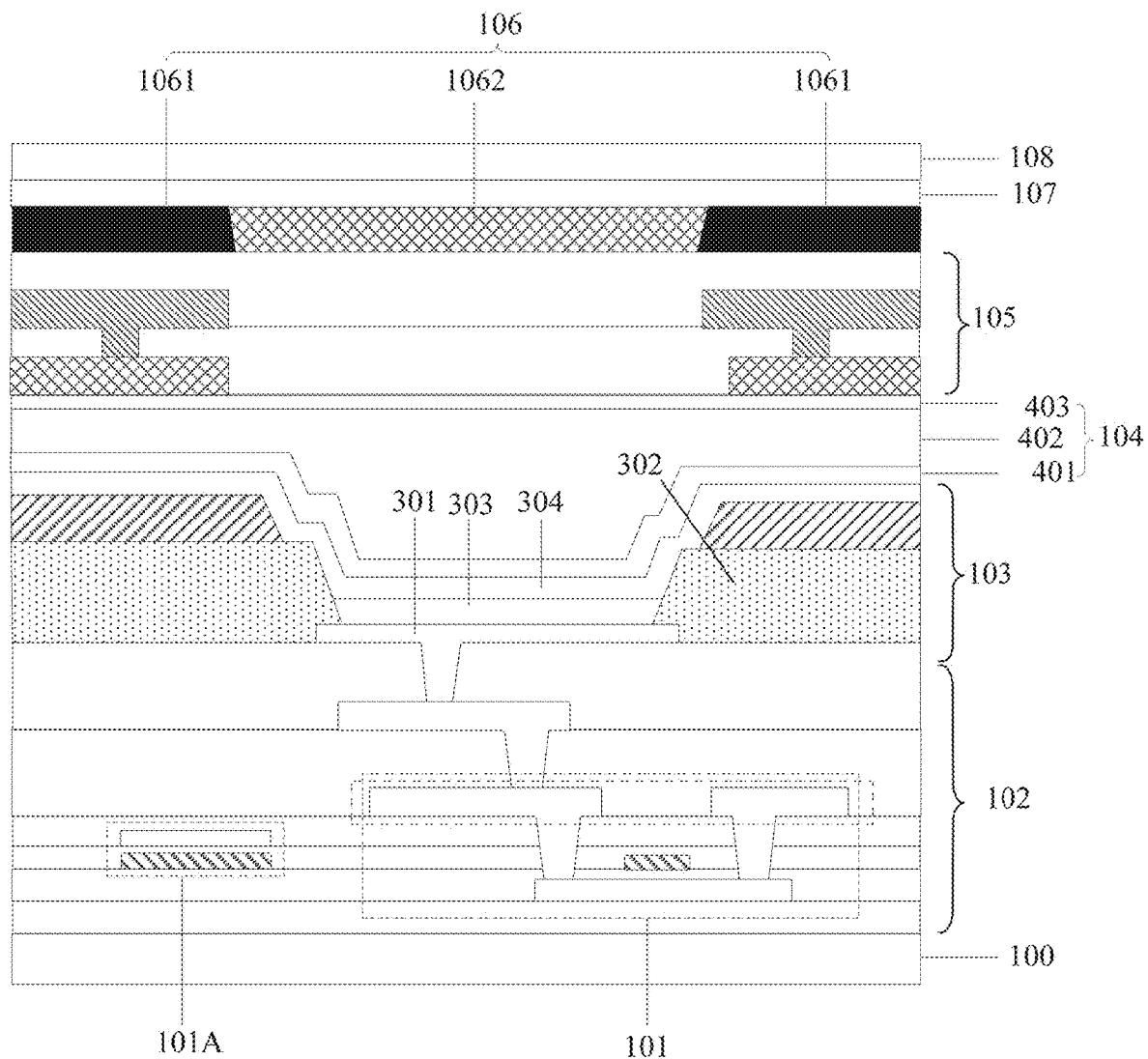
FIG. 17 is a schematic sectional view of a display substrate according to at least one embodiment of the present disclosure.

FIG. 17 is a schematic sectional view of a display substrate according to an exemplary embodiment of the present disclosure, and illustrates a structure of a sub-pixel of an OLED display substrate. As shown in FIG. 17, on a plane perpendicular to the display substrate, the display substrate may include a drive circuit layer 102 disposed on a base substrate 100, a light-emitting structure layer 103 disposed on a side of the drive circuit layer 102 away from the base substrate 100, and an encapsulation layer 104 disposed on a side of the light-emitting structure layer 103 away from the base substrate 100. In some possible implementations, the display substrate may include other film layers, such as a post spacer, which is not limited in the present disclosure.

In some exemplary implementations, the base substrate 100 may be a flexible substrate or a rigid substrate. A drive circuit layer 102 of each sub-pixel may include a plurality of transistors and a storage capacitor that form a pixel drive circuit. FIG. 3 shows an example of only one transistor 101 and one storage capacitor 101A. The light-emitting structure layer 103 may include an anode 301, a pixel definition layer 302, an organic light-emitting layer 303, and a cathode 304. The anode 301 is connected with a drain electrode of a drive transistor 101 through a via. The pixel definition layer 302 includes a first opening exposing the anode 301. The organic light-emitting layer 303 is connected with the anode 301. The cathode 304 is connected with the organic light-emitting layer 303. The organic light-emitting layer 303 is driven by the anode 301 and the cathode 304 to emit light of a corresponding color. The encapsulation layer 104 may include a first encapsulation layer 401, a second encapsulation layer 402, and a third encapsulation layer 403 that are stacked, wherein the first encapsulation layer 401 and the third encapsulation layer 403 may be made of an inorganic material, the second encapsulation layer 402 may be made of an organic material, and the second encapsulation layer 402 is disposed between the first encapsulation layer 401 and the third encapsulation layer 403 so as to prevent external water vapor from entering the light-emitting structure layer 103.

In some exemplary implementations, the organic light-emitting layer 303 may include a Hole Injection Layer (HIL for short), a Hole Transport Layer (HTL for short), an Electron Block Layer (EBL for short), an Emitting Layer (EML for short), a Hole Block Layer (HBL for short), an Electron Transport Layer (ETL for short), and an Electron Injection Layer (EIL for short) that are stacked. In an exemplary implementation, hole injection layers of all sub-pixels may be a common layer connected together, electron injection layers of all the sub-pixels may be a common layer connected together, hole transport layers of all the sub-pixels may be a common layer connected together, electron transport layers of all the sub-pixels may be a common layer connected together, hole block layers of all the sub-pixels may be a common layer connected together, emitting layers of adjacent sub-pixels may be overlapped slightly or may be spaced from each other, and electron block layers of adjacent sub-pixels may be overlapped slightly or may be isolated from each other.

In some exemplary implementations, the display substrate may also include a touch structure layer 105 disposed on a side of the encapsulation layer 104 away from the base substrate 100. The touch structure layer 105 may include a first touch structure layer, a first coated protective layer covering the first touch structure, and a second touch structure layer disposed on the first coated protective layer. The second touch structure layer may include a plurality of first touch electrodes 231, a plurality of second touch electrodes 232 and a plurality of first connection parts. The first touch structure layer may include a plurality of second connection parts. At least one of the first touch electrodes 231 and the second touch electrodes 232 is connected to the second connection part through a via penetrating the first coated protective layer. The plurality of first touch electrodes 231, the plurality of second touch electrodes 232, and the plurality of first connection parts may be formed by a same patterning process, and the first touch electrode and the first connection part may be an integral structure connected to each other. The second connection part may make the adjacent second touch electrodes connect with each other through a via. In some possible implementations, the first touch electrode 231 may include a plurality of first sub-electrodes connected through a first connection part, and the second touch electrode 232 may include a plurality of second sub-electrodes connected through a second connection part. In some possible implementations, the plurality of first touch electrodes 231, the plurality of second touch electrodes 232 and the plurality of first connection parts may be disposed in the first touch structure layer in a manner of the same layer arrangement, and the second connection part may be disposed in a bridge layer. The present disclosure is not limited thereto. In an exemplary implementation, a first touch electrode 231 may be a drive electrode (Tx) and the second touch electrode 232 may be a sensing electrode (Rx), or, the first touch electrode 231 may be a sensing electrode (Rx) and the second touch electrode 232 may be a drive electrode (Tx). In some other exemplary embodiments, the touch structure layer of embodiments of the present disclosure may also be an On Cell Touch structure, which is not limited by the present disclosure.

In an exemplary implementation, the first touch electrode 231 and the second touch electrode 232 may have a rhombic shape, for example, it may be a regular rhombic shape, a rhombic shape with a longer transverse length, or a rhombic shape with a longer longitudinal length. In some possible implementations, the first touch electrode 231 and the second touch electrode 232 may have any one or more of shapes of triangles, squares, trapezoids, parallelograms, pentagons, hexagons, and other polygons, which are not limited in the present disclosure.

In an exemplary implementation, the first touch electrodes 231 and the second touch electrodes 232 may be in a form of a metal mesh. The metal mesh is formed by a plurality of interweaving metal wires and includes a plurality of mesh patterns, wherein a mesh pattern is a polygon formed by a plurality of metal wires. The formed first touch control electrodes and the second touch control electrodes with the form of the metal mesh have the advantages of low resistance, less thickness, fast response speed and the like. In an exemplary implementation, the region enclosed by metal wires in a mesh pattern unit contains the region of sub-pixels in the display structure layer, and the metal wires are located between adjacent sub-pixels. For example, when the display structure layer is an OLED display structure layer, the region of sub-pixels may be the light-emitting region defined by a pixel definition layer in the light-emitting structure layer. The region enclosed by the metal wires contains the light-emitting region, and the metal wires are located in the corresponding positions on the pixel definition layer, i.e., in the non-light-emitting region.

In some exemplary implementations, the display substrate may also include a color filter layer 106 disposed on a side of the touch structure layer 105 away from the base substrate 100, the color filter layer 106 may include color filters 1062 of different colors and a black matrix 1061 disposed between the color filters 1062 of different colors, the black matrix 1061 includes a second opening exposing the color filter 1062. Because the conventional polarizer has poor foldability and poor light transmittance, the embodiment of the present disclosure uses a color filter layer (CF on Encapsulation, COE) instead of the polarizer to form a display substrate structure with multi-functional layers stacked and good foldability.

In some exemplary implementations, the orthographic projection of the touch structure layer 105 on the base substrate 100 is located within the range of the orthographic projection of the pixel definition layer 302 on the base substrate, and the orthographic projection of the color filter 1062 on the base substrate 100 includes the orthographic projection of the organic light-emitting layer 303 on the base substrate 100.

In some exemplary implementations, the display substrate may also include an anti-reflection layer 107 covering the color filter layer 106 and a cover plate 108 disposed above the anti-reflection layer 107, and the anti-reflection layer 107 is configured to reduce the reflectivity of light from the light-exit side of the display substrate.

In some exemplary implementations, at least one of the first sub-region A-R2 of the second sub-display region and the second sub-region B-R2 of the second sub-display region may include only a base substrate 100 and a light-emitting structure layer 103, an encapsulation layer 104 and a color filter layer 106 that are disposed on the base substrate 100, that is, at least one of the first sub-region A-R2 of the second sub-display region and the second sub-region B-R2 of the second sub-display region may not be provided with a drive circuit layer 102 and a touch structure layer 105.

In some other exemplary implementations, at least one of the first sub-region A-R2 of the second sub-display region and the second sub-region B-R2 of the second sub-display region may include only a base substrate 100 and a light-emitting structure layer 103, an encapsulation layer 104, a touch structure layer 105 and a color filter layer 106 that are disposed on the base substrate 100, that is, at least one of the first sub-region A-R2 of the second sub-display region and the second sub-region B-R2 of the second sub-display region may not be provided with a drive circuit layer 102.

In some exemplary implementations, the pixel definition layer 302 may be made of a black material to distinguish the first sub-region A-R1 of the first sub-display region and the first sub-region A-R2 of the second sub-display region, or the second sub-region B-R1 of the first sub-display region and the second sub-region B-R2 of the second sub-display region.

In some exemplary implementations, a thickness of the black tone matrix 1061 located in the first sub-region A-R2 of the second sub-display region or the second sub-region B-R2 of the second sub-display region in the direction perpendicular to the display substrate is less than a thickness of the black matrix 1061 located in the first sub-region A-R1 of the first sub-display region or the second sub-region B-R1 of the first sub-display region in the direction perpendicular to the display substrate, to further improve the light transmittance of the first sub-region A-R2 of the second sub-display region or the second sub-region B-R2 of the second sub-display region.

In some exemplary implementations, a maximum thickness of the color filter 1062 in the direction perpendicular to the display substrate is greater than a maximum thickness of the black matrix 1061 in the direction perpendicular to the display substrate, and the color filter 1062 at least partially covers the black matrix 1061. In this embodiment, the color filter 1062 has a convex structure, forming a convex lens effect, and further improving the light exiting efficiency.

Figure 18:
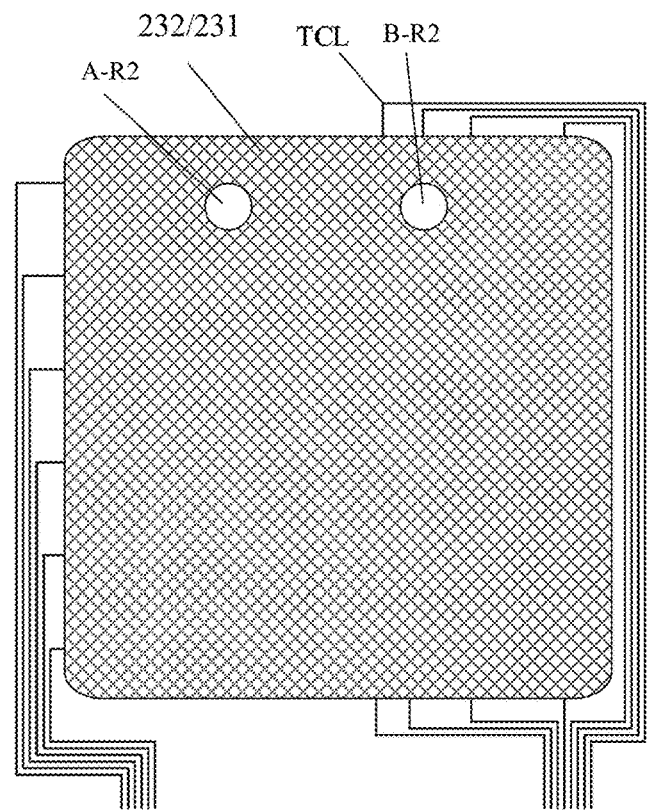
FIG. 18 is a schematic diagram of a touch structure layer of a display substrate according to at least one embodiment of the present disclosure.

In some exemplary implementations, as shown in FIG. 18, the touch structure layer 105 may be located in the first sub-region A-R1 of the first sub-display region and the second sub-region B-R1 of the first sub-display region. The touch structure layer 105 may also include a plurality of touch signal lines TCL. The touch signal line TCL is used for transmitting the touch signal loaded on the corresponding touch electrode to the touch drive circuit. The touch structure layers 105 of the first sub-region A-R2 of the second sub-display region and the second sub-region B-R2 of the second sub-display region are removed. Because the structure of the touch structure layer is a metal mesh structure, removing the touch structure layers 105 of the first sub-region A-R2 of the second sub-display region and the second sub-region B-R2 of the second sub-display region can improve the transmittance.

Figure 19:
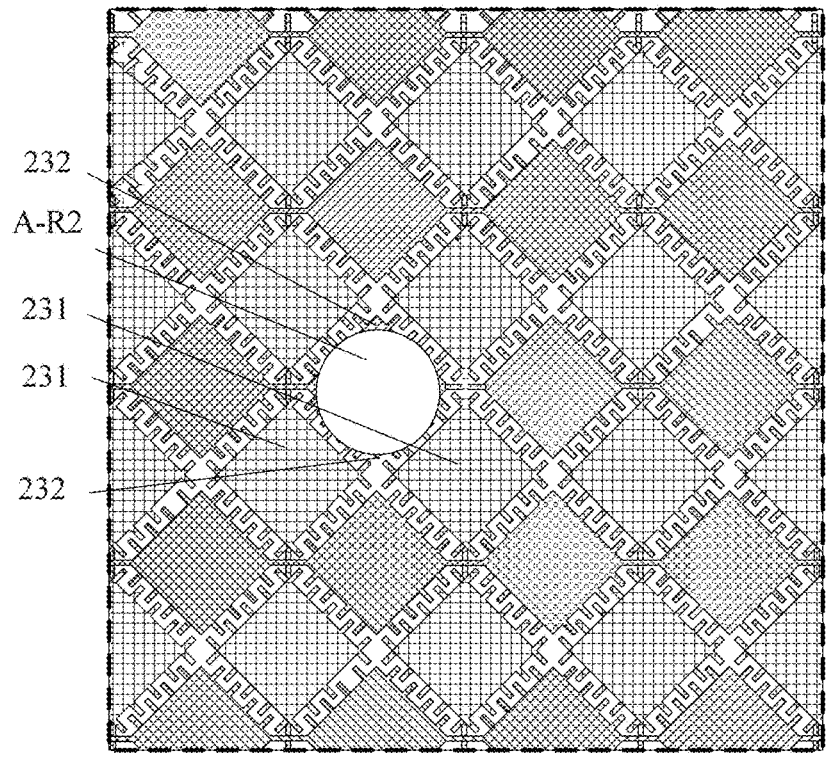
FIG. 19 is another schematic diagram of a touch structure layer of a display substrate according to at least one embodiment of the present disclosure.

In some exemplary implementations, the orthographic projection of the second sub-display region on the base substrate does not overlap with the orthographic projection of the first connection part on the base substrate, and the orthographic projection of the second sub-display region on the base substrate does not overlap with the orthographic projection of the second connection part on the base substrate. As shown in FIG. 19, at present, the size of a transparent display region (the first sub-region A-R2 of the second sub-display region or the second sub-region B-R2 of the second sub-display region) is basically the same as that of a touch electrode block (about 4 mm). Therefore, taking one digging hole in the first sub-region A-R2 of the second sub-display region or the second sub-region B-R2 of the second sub-display region of the second sub-display region as an example, the digging hole may be just disposed in a touch electrode block, and the touch electrode block may be an RX electrode block or a TX electrode block, so that the digging hole region may keep off the touch bridge and the transparent display region may be correspondingly disposed with a touch electrode block, thus simplifying the design of the display substrate. However, embodiments of the present disclosure are not limited thereto.

In some exemplary implementations, the black matrix 1061 located in the digging hole region may be of an annular structure (a circle around the sub-pixels), and the cathode 304 is discontinuous in the digging hole region.

Figure 20:
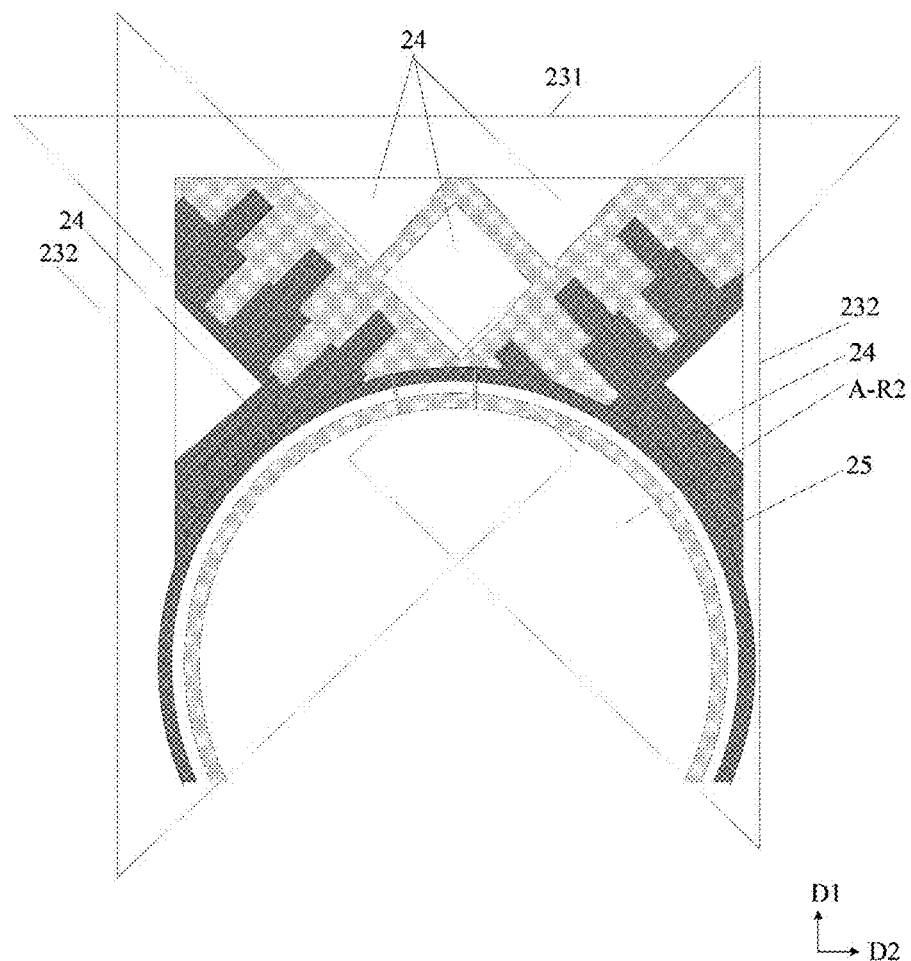
FIG. 20 is a further schematic diagram of a touch structure layer of a display substrate according to at least one embodiment of the present disclosure.

In some exemplary implementations, since the capacitance of the touch electrode decreases because of the digging hole, compensation may be performed on the touch electrodes around the first sub-region A-R2 of the second sub-display region or the second sub-region B-R2 of the second sub-display region by designing. Exemplarily, as shown in FIG. 20, compensation electrodes are designed in the region surrounding the digging hole, and the compensation electrodes are also of a metal mesh structure, to optimize visibility and reduce Mura (referring to the phenomenon that the brightness of the display is uneven and various traces occur).

Figure 21:
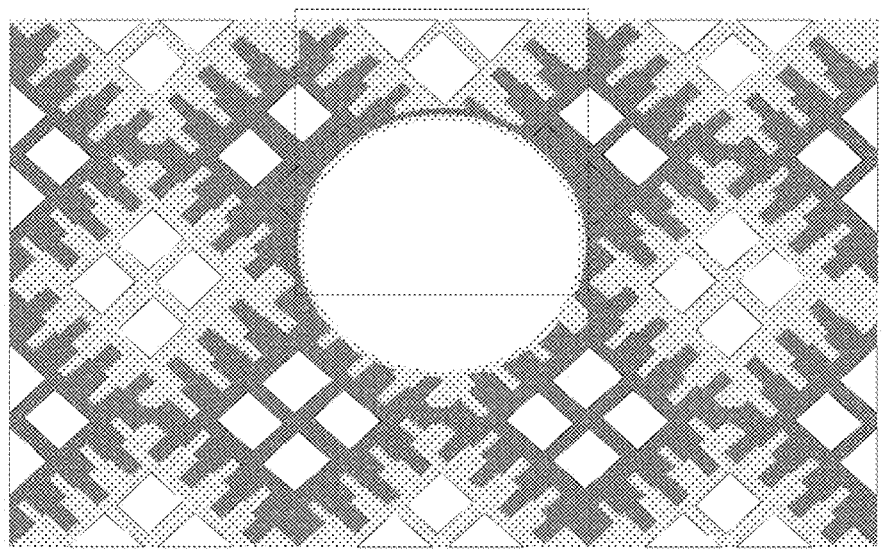
FIG. 21 is a further schematic diagram of a touch structure layer of a display substrate according to at least one embodiment of the present disclosure.
Figure 22A:
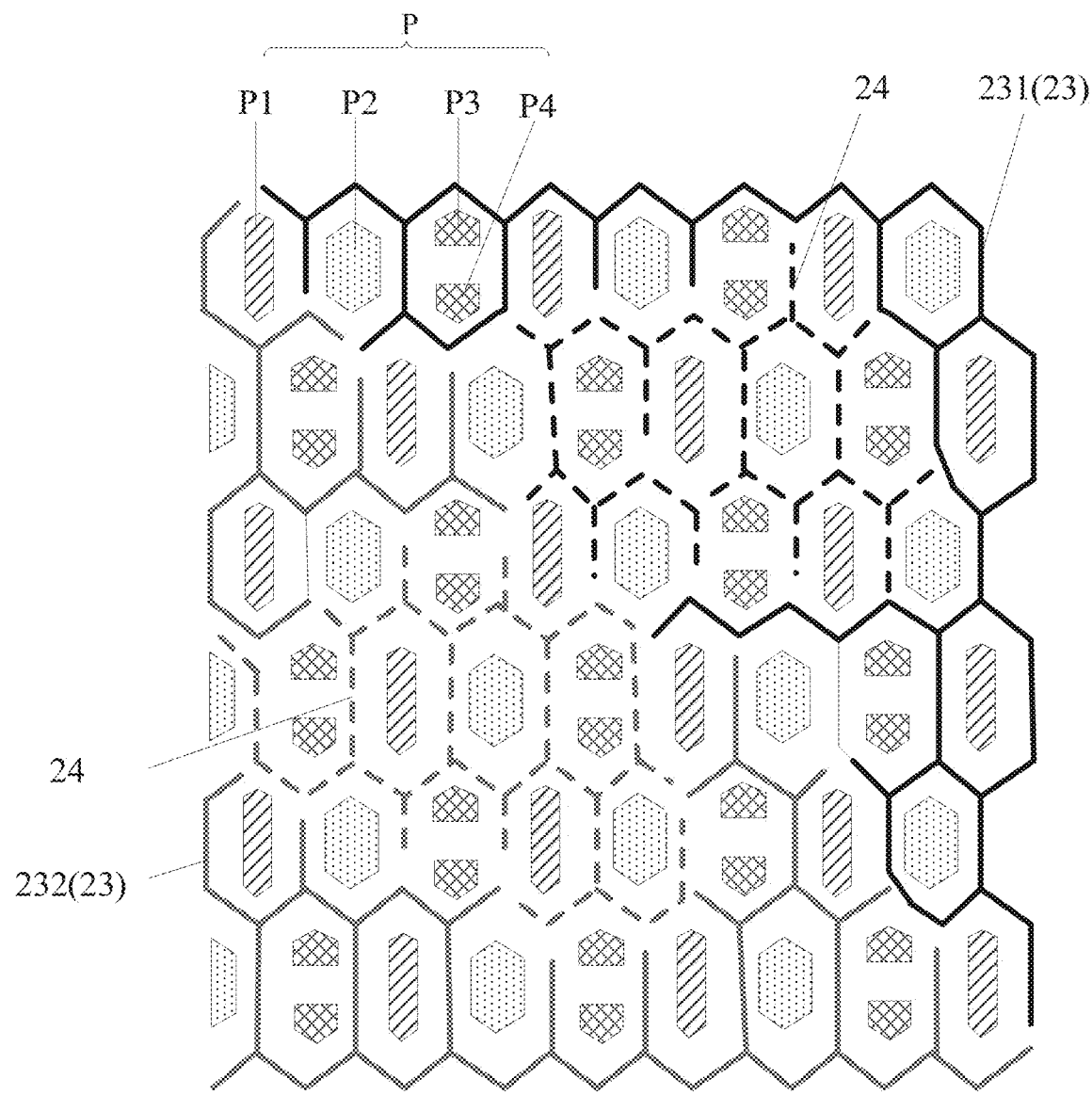
FIG. 22A is a further schematic diagram of a touch structure layer of a display substrate according to at least one embodiment of the present disclosure.

In some exemplary implementations, as shown in FIG. 21 and FIG. 22A, the touch structure layer 105 may also include a plurality of Dummy touch electrodes 24, some of which are connected with a touch electrode block surrounding the digging hole region.

In some exemplary implementations, as shown in FIG. 22A, the first touch electrode 231, the second touch electrode 232, and the dummy touch electrode 24 are all disposed around a sub-pixel (i.e., opening of the pixel definition layer).

In some exemplary implementations, the display substrate may include a plurality of pixel units P arranged in a matrix manner, and at least one pixel unit P may include a first sub-pixel P1 emitting a first color light, a second sub-pixel P2 emitting a second color light, and a third sub-pixel P3 emitting a third color light and a fourth sub-pixel P4 emitting a third color light. Each of the four sub-pixels may include a circuit unit and a light-emitting device, the circuit unit may include a scan signal line, a data signal line and a light-emitting signal line and a pixel drive circuit, and the pixel drive circuit is respectively connected with the scan signal line, the data signal line, and the light-emitting signal line. The pixel drive circuit is configured to receive the data voltage transmitted by the data signal line and output a corresponding current to the light-emitting device under the control of the scan signal line and the light-emitting signal line. The light-emitting device in each sub-pixel is connected with a pixel drive circuit of a sub-pixel where the light-emitting device is located, and is configured to emit light with a corresponding brightness in response to a current output by the pixel drive circuit of the sub-pixel where the light-emitting device is located.

Figure 22B:
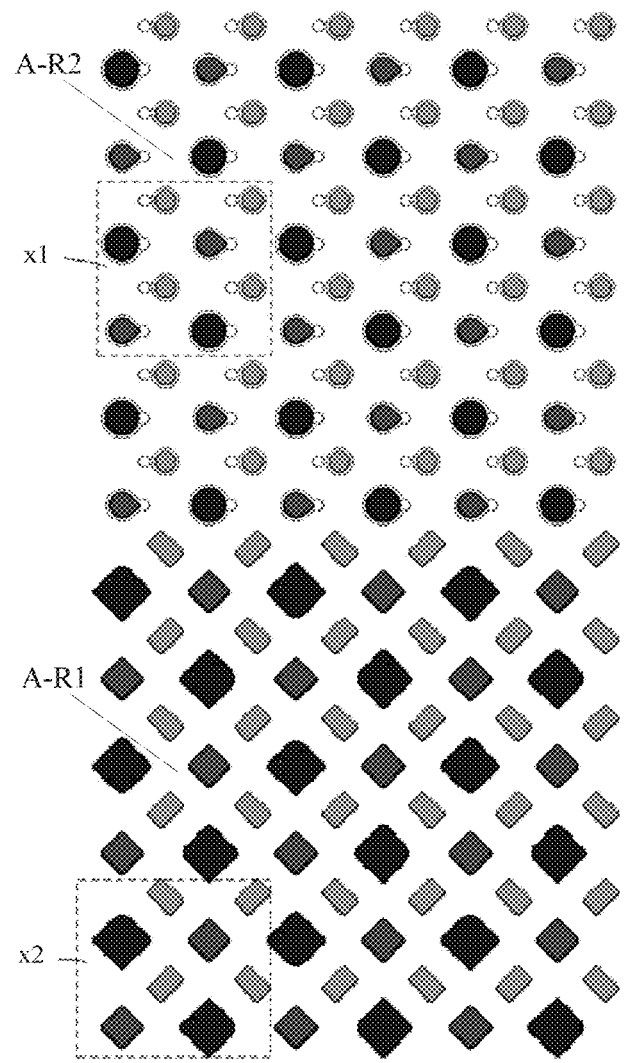
FIG. 22B is a schematic diagram of a pixel arrangement of a display substrate according to at least one embodiment of the present disclosure.

In some exemplary implementations, as shown in FIG. 22B, in a transparent display region (the first sub-region A-R2 of the second sub-display region or the second sub-region B-R2 of the second sub-display region), the pattern of the orthographic projection of the opening of the pixel definition layer of the first sub-pixel P1 on the base substrate is in a shape of a water droplet, the pattern of the orthographic projection of the opening of the pixel definition layer of the second sub-pixel P2 on the base substrate is in a shape of a circle, and the pattern of the orthographic projection of the opening of the pixel definition layer of the third sub-pixel P3 on the base substrate is in a shape of a circle.

In some exemplary implementations, the first sub-pixel P1 may be a red sub-pixel (R) emitting red light, the second sub-pixel P2 may be a blue sub-pixel (B) emitting blue light, and the third sub-pixel P3 and the fourth sub-pixel P4 may be green sub-pixels (G) emitting green light. In an exemplary implementation, the sub-pixel may be in a shape of a rectangle, a rhombus, a pentagon, or a hexagon. In some other exemplary implementations, the pixel unit P may include three sub-pixels, the three sub-pixels may be arranged side by side horizontally, side by side vertically, or in a shape of a Chinese character "品", etc., which is not limited in the present disclosure.

Figure 23:
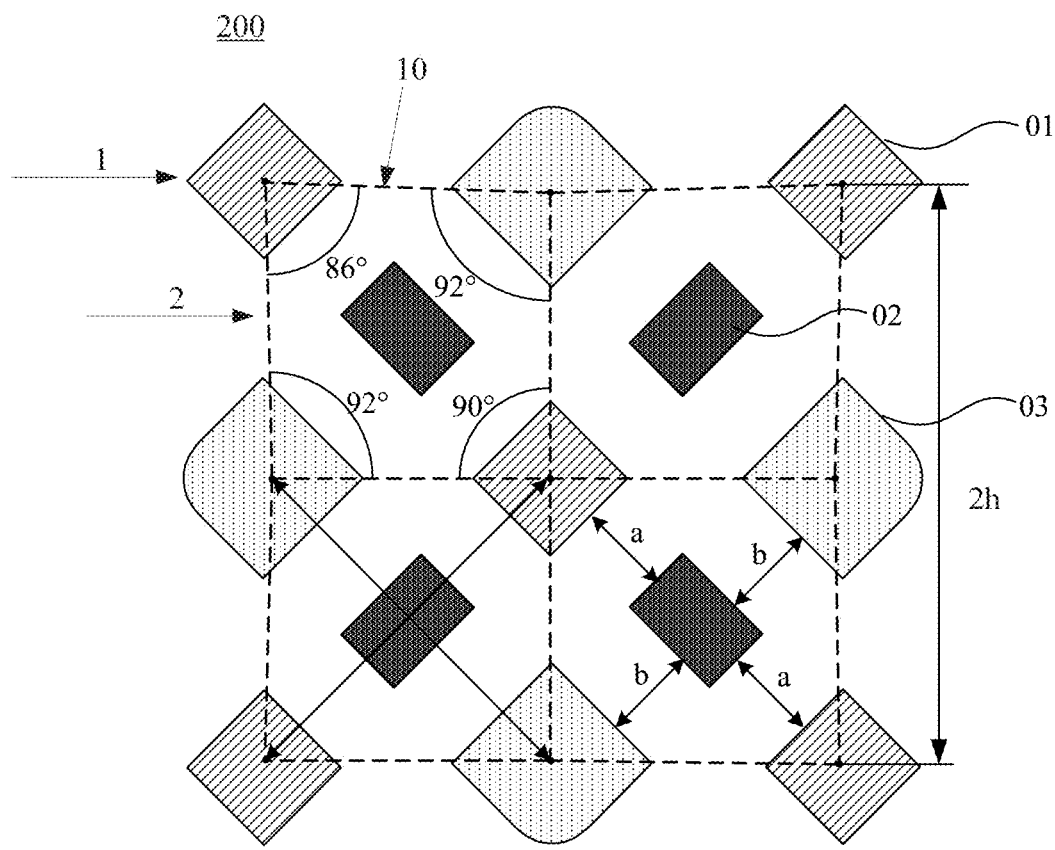
FIG. 23 is another schematic diagram of a pixel arrangement of a display substrate according to at least one embodiment of the present disclosure.

In some exemplary implementations, as shown in FIG. 23, the display substrate of the embodiment of the present disclosure further provides a pixel array including a plurality of first pixel rows 1 and a plurality of second pixel rows 2, and the first pixel row 1 and the second pixel row 2 are disposed alternately. The first pixel row 1 is formed by red sub-pixels 01 and blue sub-pixels 03, which are disposed alternately, and the red sub-pixels 01 and the blue sub-pixels 03 which are located in the same column in the plurality of first pixel rows 1 are also disposed alternately. The second pixel row 2 is formed by a plurality of green sub-pixels 02 arranged side by side, and the green sub-pixels 02 are interleaved with red sub-pixels 01 and blue sub-pixels 03 in adjacent rows. A first virtual quadrilateral 10 is formed by sequentially connecting the centers of two red sub-pixels 01 and two blue sub-pixels 03 arranged in an array, and a green sub-pixel 02 is disposed in each first virtual quadrilateral 10; wherein, at least part of the internal angles of the first virtual quadrilateral 10 are not equal to 90°; and the distance from the intersection point of the extension line of both sides of at least one vertex angle of at least one of the red sub-pixel 01, green sub-pixel 02, and blue sub-pixel 03 to the center of the sub-pixel is different from the distance from the intersection point of the extension lines of both sides of its diagonal angle to the center of the sub-pixel.

In the embodiment of the present disclosure, the shapes of some sub-pixels are adjusted so that at least part of the internal angles of the first virtual quadrilateral 10 formed by the connection line between the centers of the red sub-pixel 01 and the blue sub-pixel 03 are not equal to 90°, and the distance from the intersection point of the extension line of both sides of at least one vertex angle of at least one of the red sub-pixel 01, green sub-pixel 02, and blue sub-pixel 03 to the center of the sub-pixel is different from the distance from the intersection point of the extension lines of both sides of its diagonal angle to the center of the sub-pixel, in order to adjust an actual brightness center in each virtual pixel unit, so that the distribution of various actual brightness centers in the whole display panel is more uniform.

In some exemplary implementations, if the first corner of the blue sub-pixel 03 is circular chamfered and flat chamfered, and then the distance from the apex of the first corner of the blue sub-pixel 03 to the boundary of the light-emitting layer is not equal to the distances from the apexes of other vertex angles to the boundary of the light-emitting layer. For example, there is a certain distance from the apex of the first corner of the blue sub-pixel 03 to the boundary, while the distances from other vertex angles to the boundary of the pixel are approximately 0. That is, the distance from the apex of the first corner of the blue sub-pixel 03 to the boundary is larger than the distances from the apexes of other vertex angles to the boundary of the blue sub-pixel 03.

In some exemplary implementations, each first virtual quadrilateral 10 is formed by sequentially connecting the centers of two red sub-pixels 01 and two blue sub-pixels 03 arranged in an array, that is, two red sub-pixels 01 and two blue sub-pixels 03 are respectively disposed at positions of four vertex angles of each first virtual quadrilateral 10, wherein the two red sub-pixels 01 are disposed at two opposite vertex positions of the first virtual quadrilateral 10, the two blue sub-pixels 03 are disposed at the other two opposite vertex positions of the first virtual quadrilateral 10, and a green sub-pixel 02 is disposed at the center position of each first virtual quadrilateral 10. Four first virtual quadrilaterals 10 form a second virtual quadrilateral 200, and adjacent disposed first virtual quadrilaterals 10 share sides.

In some exemplary implementations, as shown in FIG. 23, the first corner of the blue sub-pixel 03 is rounded chamfered, and the second, third and fourth corners all include an angle similar to a right angle. Two blue sub-pixels 03 located in a same column are symmetrically disposed along the row direction. For two adjacent first pixel rows 1, the orientations of the first corners of all blue sub-pixels 03 in one row are the same, and the orientations of the first corners of all blue sub-pixels 03 in the other row are opposite.

In some exemplary implementations, as shown in FIG. 23, the first virtual quadrilateral 10 in the upper left corner has a pair of equal diagonal angles (shown as 92°), and the other corner is 90°. The other first virtual quadrilaterals 10 have at least one corner of 90°, and the apex of the angle of 90° is located at the center of the red pixel. The diagonal blue sub-pixels 03 around each red sub-pixel 01 are symmetrical about the center of the red sub-pixel 01.

In some exemplary implementations, as shown in FIG. 23, assuming that the connection line between the centers of the red sub-pixel 01 and the blue sub-pixel 03 disposed adjacently in the same column is h, in this case, the second virtual quadrilateral 200 is a square with a side length of 2 h, and its central position is a red sub-pixel 01. For each of the first virtual quadrilateral 10, the center of the green sub-pixel 02 is located on a center line of a line connecting the centers of the red sub-pixel 01 and the blue sub-pixel 03 which are disposed adjacent to each other in the row direction or the column direction. In addition, as shown in FIG. 23, in each first virtual quadrilateral 10, the vertical distances from the center of the green sub-pixels 02 to the boundaries of the light-emitting regions of the red sub-pixel 01 and the blue sub-pixel 03 are a and b respectively, wherein a=b.

In some exemplary implementations, the anode 301 may be a Magic arrangement (i.e., the arrangement shown in FIG. 23, which is similar to a third-order Rubik's Cube). The shape of the first opening of the pixel definition layer 302 may coincide with the shape of the edge of the anode 301. The shape of the second opening of the black matrix 1061 may coincide with the shape of the first opening of the pixel definition layer 302. In some exemplary implementations, the second opening of the black matrix 1061 may expand outward from the first opening of the pixel definition layer 302, in this case, the pixel definition layer 302 may be made of a black material to enhance the viewing angle. In some other exemplary implementations, the second opening of the black matrix 1061 may be retracted from the first opening of the pixel definition layer 302, in this case, the color of the pixel definition layer 302 is not limited, improving the optical effect and reducing the reflection. In some still exemplary implementations, the orthographic projection of the second opening of the black matrix 1061 on the display substrate may overlap with the orthographic projection of the first opening of the pixel definition layer 302 on the display substrate.

In some exemplary implementations, the anode 301 may be a Magic arrangement (i.e., the arrangement shown in FIG. 23). The shape of the first opening of the pixel definition layer 302 may coincide with the shape of the edge of the anode 301. The shape of the second opening of the black matrix 1061 may be circular or substantially circular, and the present scheme may further improve the color separation of the dark state. In some exemplary implementations, the second opening of the black matrix 1061 may expand outward from the opening of the pixel definition layer 302, in this case, the pixel definition layer 302 may be made of a black material to enhance the viewing angle. In some other exemplary implementations, the second opening of the black matrix 1061 may be retracted from the first opening of the pixel definition layer 302, in this case, the color of the pixel definition layer 302 is not limited, improving the optical effect and reducing the reflection. In some still exemplary implementations, the orthographic projection of the second opening of the black matrix 1061 on the display substrate may overlap with the orthographic projection of the first opening of the pixel definition layer 302 on the display substrate.

In some exemplary implementations, the anode 301 may be a Magic arrangement (i.e., the arrangement shown in FIG. 23), the shape of the first opening of the pixel definition layer 302 and the shape of the second opening of the black matrix 1061 may both be circular or substantially circular, and the present scheme may also improve the color separation of the dark state. In some exemplary implementations, the second opening of the black matrix 1061 may expand outward from the first opening of the pixel definition layer 302, in this case, the pixel definition layer 302 may be made of a black material to enhance the viewing angle. In some other exemplary implementations, the second opening of the black matrix 1061 may be retracted from the first opening of the pixel definition layer 302, in this case, the color of the pixel definition layer 302 is not limited, improving the optical effect and reducing the reflection. In some still exemplary implementations, the orthographic projection of the second opening of the black matrix 1061 on the display substrate may overlap with the orthographic projection of the first opening of the pixel definition layer 302 on the display substrate.

In some exemplary implementations, the display substrate includes a plurality of insulating layers in a direction perpendicular to the display substrate, each of which may be made of a black material.

In some exemplary implementations, the distance between the boundary of the second opening of the black matrix 1061 and the boundary of the first opening of the pixel definition layer 302 may be 0 to 6 microns (μm).

Figure 24:
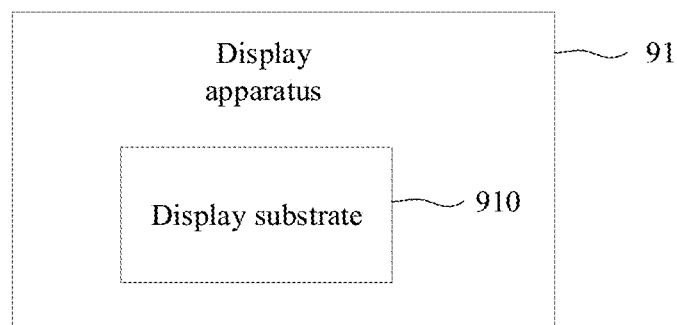
FIG. 24 is a schematic diagram of a display apparatus according to at least one embodiment of the present disclosure.

FIG. 24 is a schematic diagram of a display apparatus according to at least one embodiment of the present disclosure. As shown in FIG. 24, a display apparatus 91 is provided in this embodiment, which includes a display substrate 910 in the aforementioned embodiments. In some examples, the display substrate 910 may be an OLED display substrate, a QLED display substrate, a Micro-LED display substrate, or a Mini-LED display substrate. The display apparatus 91 may be any product or component with a display function, such as a mobile phone, a tablet computer, a television, a display, a notebook computer, a digital photo frame, and a navigator. However, the embodiments of the present disclosure are not limited to this.

The drawings of the present disclosure only involve structures involved in the present disclosure, and other structures may refer to conventional designs. The embodiments in the present disclosure, i.e., features in the embodiments, may be combined with each other to obtain new embodiments if there is no conflict.

Those of ordinary skill in the art should understand that modifications or equivalent replacements of the technical solutions of the present disclosure may be made without departing from the essence and scope of the technical solutions of the present disclosure, and shall all fall within the scope of the claims of the present disclosure.

The invention claimed is:

1. A display substrate, comprising:
a base substrate, comprising a display region and a frame region located on at least one side of the display region, wherein the display region comprises a first display region and a second display region, the first display region comprises a first sub-region of a first sub-display region and a first sub-region of a second sub-display region, the second display region comprises a second sub-region of the first sub-display region and a second sub-region of the second sub-display region, the first sub-region of the first sub-display region at least partially surrounds the first sub-region of the second sub-display region, the second sub-region of the first sub-display region at least partially surrounds the second sub-region of the second sub-display region, the first sub-region of the first sub-display region and the second sub-region of the first sub-display region form the first sub-display region, and the first sub-region of the second sub-display region and the second sub-region of the second sub-display region form the second sub-display region;
a plurality of pixel circuits and a plurality of first light-emitting elements, located in the first sub-display region; wherein the plurality of pixel circuits comprise: a plurality of first pixel circuits and a plurality of second pixel circuits, the plurality of second pixel circuits are distributed among the plurality of first pixel circuits, and at least one pixel circuit of the plurality of first pixel circuits is connected with at least one light-emitting element of the plurality of first light-emitting elements;
a plurality of second light-emitting elements located in the second sub-display region; wherein at least one pixel circuit of the plurality of second pixel circuits is connected with at least one light-emitting element of the plurality of second light-emitting elements;
at least one first data line located in the first sub-display region; wherein the first data line comprises a plurality of interconnected sub-data lines, the sub-data line extends along a first direction and/or a second direction, and the first direction intersects the second direction; the first data line at least comprises one sub-data line connected with the first pixel circuit and at least comprises another sub-data line connected with the second pixel circuit.

2. The display substrate according to claim 1, wherein the second sub-display region comprises a blue light-emitting element, a red light-emitting element and a green light-emitting element, and the second sub-display region further comprises at least one third pixel circuit connected with the blue light-emitting element, and the red light-emitting element is connected with the second pixel circuit located in the first sub-display region;
the green light-emitting element is connected with the second pixel circuit located in the first sub-display region; and/or, the second sub-display region further comprises at least one fourth pixel circuit connected with the green light-emitting element.

3. The display substrate according to claim 1, further comprising at least one fifth pixel circuit, wherein a part of the fifth pixel circuit is located in the first sub-display region, and another part of the fifth pixel circuit is located in the second sub-display region.

4. The display substrate according to claim 1, further comprising a virtual axis located between the first sub-display region and the second sub-display region, the virtual axis overlaps with a folding axis, and an orthographic projection of sub-data lines extending along the second direction on the display substrate does not overlap with an orthographic projection of the virtual axis on the display substrate.

5. The display substrate according to claim 1, wherein, the first data line comprises a first sub-data line, a third sub-data line, a data connection line, and a second sub-data line, that are connected sequentially;
the first sub-display region comprises a first part of the first sub-display region and a second part of the first sub-display region located on opposite sides of the second sub-display region in the first direction, and a third part of the first sub-display region located on opposite sides of the second sub-display region in the second direction;

the first sub-data line is located in the first part of the first sub-display region, the second sub-data line is located in the second part of the first sub-display region, the third sub-data line is located in the third part of the first sub-display region, and the data connection line is located in the frame region.

6. The display substrate according to claim 5, wherein, at least two sub-data lines of the first data line are symmetrically distributed with a center line of the first sub-region of the second sub-display region in the second direction as a symmetry axis.

7. The display substrate according to claim 5, wherein, at least one of the first data lines comprises a first sub-data line and a second sub-data line that are located on a side of the center line of the first sub-region of the second sub-display region along the second direction, and comprises a third sub-data line located on the other side of the center line of the first sub-region of the second sub-display region along the second direction.

8. The display substrate according to claim 7, wherein, in the first display region, a first data line overlapping with the center line of the first sub-region of the second sub-display region along the second direction is located on a side, near the first sub-region of the second sub-display region, of a first data line that does not overlap with the center line of the first sub-region of the second sub-display region along the second direction.

9. The display substrate according to claim 5, wherein, at least one of the first data lines comprises a part of a sub-data line located in the first sub-region of the first sub-display region, and comprises a part of the sub-data lines located in the second sub-region of the first sub-display region.

10. The display substrate according to claim 1, further comprising at least one data drive chip, wherein the data drive chip is located in the frame region, the first sub-region of the second sub-display region is located on a side of the first sub-region of the first sub-display region away from the data drive chip, and the second sub-region of the second sub-display region is located on a side of the second sub-region of the first sub-display region near the data drive chip.

11. The display substrate according to claim 1, further comprising two data drive chips, wherein, one of the data drive chips is connected with a data line in the first display region, and the other one of the data drive chips is connected with a data line in the second display region.

12. The display substrate according to claim 1, wherein, the first display region and the second display region are symmetrically distributed with a center line of the display substrate in the first direction as a symmetry axis.

13. The display substrate according to claim 12, wherein, the first sub-region of the second sub-display region and the second sub-region of the second sub-display region are symmetrically distributed with the center line of the display substrate in the first direction as a symmetry axis, and the first sub-region of the second sub-display region and the second sub-region of the second sub-display region are located between same plurality of the first data lines.

14. The display substrate according to claim 13, further comprising two data drive chips and a second data line, wherein the second data line is connected with a column of first pixel circuits, one of the data drive chips is connected with the first data line, and the other one of the data drive chips is connected with the second data line.

15. The display substrate according to claim 14, wherein, both of the data drive chips are located on a side of the frame region, or the two data drive chips are located on different sides of the frame region.

16. The display substrate according to claim 1, wherein, on a plane perpendicular to the display substrate, the first sub-display region comprises a base substrate, and a drive circuit layer, a light-emitting structure layer, an encapsulation layer, a touch control structure layer and a color filter layer, that are sequentially stacked on the base substrate, and the second sub-display region comprises a base substrate, and a light-emitting structure layer, an encapsulation layer and a color filter layer, that are sequentially stacked on the base substrate.

17. The display substrate according to claim 16, wherein, the color filter layer comprises a plurality of color filters of different colors and a black matrix disposed between the plurality of color filters of different colors, and a thickness of a black matrix in the second sub-display region in a direction perpendicular to the display substrate is smaller than a thickness of a black matrix of the first sub-display region in a direction perpendicular to the display substrate.

18. The display substrate according to claim 17, wherein, the light-emitting structure layer comprises a pixel definition layer, an anode, a cathode, and an organic light-emitting layer, wherein the pixel definition layer comprises a first opening exposing the anode, the black matrix comprises a second opening exposing the color filter, an orthographic projection of the second opening on the base substrate comprises an orthographic projection of the first opening on the base substrate, and the pixel definition layer adopts a black material.

19. The display substrate according to claim 16, wherein, the touch structure layer comprises a plurality of first touch electrodes arranged along the first direction and a plurality of second touch electrodes arranged along the second direction, the first touch electrode comprises a plurality of first sub-electrodes connected through a first connection part, the second touch electrode comprises a plurality of second sub-electrodes connected through a second connection part, an orthographic projection of the second sub-display region on the base substrate does not overlap with an orthographic projection of the first connection part on the base substrate, and the orthographic projection of the second sub-display region on the base substrate does not overlap with an orthographic projection of the second connection part on the base substrate.

20. A display apparatus, comprising the display substrate according to claim 1.

* * * * *